(12) United States Patent
Furukawa

(10) Patent No.: US 10,694,081 B2
(45) Date of Patent: Jun. 23, 2020

(54) INFORMATION PROCESSING APPARATUS AND INFORMATION PROCESSING METHOD

(71) Applicant: SONY CORPORATION, Tokyo (JP)

(72) Inventor: Kendai Furukawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/081,568

(22) PCT Filed: Feb. 24, 2017

(86) PCT No.: PCT/JP2017/006988
§ 371 (c)(1),
(2) Date: Aug. 31, 2018

(87) PCT Pub. No.: WO2017/154606
PCT Pub. Date: Sep. 14, 2017

(65) Prior Publication Data
US 2019/0028616 A1    Jan. 24, 2019

(30) Foreign Application Priority Data

Mar. 10, 2016  (JP) ................................ 2016-046634

(51) Int. Cl.
*H04N 5/247* (2006.01)
*H04N 19/597* (2014.01)
(Continued)

(52) U.S. Cl.
CPC ........... *H04N 5/2224* (2013.01); *G03B 35/08* (2013.01); *G06T 1/00* (2013.01); *G06T 7/596* (2017.01);
(Continued)

(58) Field of Classification Search
CPC ...... H04N 5/2224; H04N 5/247; G06T 7/596; G06T 7/60
(Continued)

(56) References Cited

U.S. PATENT DOCUMENTS

| 2015/0042767 A1 | 2/2015 | Ciurea et al. |
| 2015/0278996 A1 | 10/2015 | Tsutsumi |
| 2016/0323559 A1* | 11/2016 | Matsunobu .......... H04N 13/296 |

FOREIGN PATENT DOCUMENTS

| CN | 101453662 A | 6/2009 |
| EP | 2234406 A1 | 9/2010 |

(Continued)

OTHER PUBLICATIONS

Jan. 3, 2019, European Search Report issued for related EP Application No. 17762946.6.

(Continued)

*Primary Examiner* — Thai Q Tran
*Assistant Examiner* — Jose M Mesa
(74) *Attorney, Agent, or Firm* — Paratus Law Group, PLLC

(57) ABSTRACT

The present disclosure relates to an information processing apparatus and an information processing method that are configured to be capable of efficiently acquiring information for use in generating three-dimensional data from two-dimensional image data. A grouping block sorts two or more virtual cameras for acquiring two-dimensional image data into two or more groups. A global table generation block generates a global table in which group information related with each of two or more groups is registered. A group table generation block generates, for each group, a group table in which camera information for use in generating three-dimensional data from two-dimensional image data acquired by a virtual camera sorted into a group is registered. The present disclosure is applicable to an encoding apparatus and the like, for example.

14 Claims, 24 Drawing Sheets

(51) Int. Cl.
  *G03B 35/08* (2006.01)
  *G06T 1/00* (2006.01)
  *G06T 7/60* (2017.01)
  *H04N 5/222* (2006.01)
  *H04N 5/232* (2006.01)
  *G06T 7/593* (2017.01)
(52) U.S. Cl.
  CPC ............ *G06T 7/60* (2013.01); *H04N 5/23238* (2013.01); *H04N 5/247* (2013.01); *H04N 19/597* (2014.11)
(58) Field of Classification Search
  USPC .......................................................... 348/43
  See application file for complete search history.

(56) References Cited

FOREIGN PATENT DOCUMENTS

EP          2385705 A1     11/2011
JP          2016-005027 A   1/2016

OTHER PUBLICATIONS

Moezzi et al., Virtual View Generation for 3D Digital Video, Immersive Telepresence, IEEE MultiMedia, Jan.-Mar. 1997, pp. 18-26, IEEE.
Kanade et al., Virtualized Reality: Constructing Virtual Worlds from Real Scenes, Immersive Telepresence, IEEE MultiMedia, Jan.-Mar. 1997, pp. 34-46, IEEE.
Jan. 6, 2020, Chinese Office Action issued for related CN Application No. 201780014963.9.

* cited by examiner

FIG. 5

| GROUP ID | GRAVITY CENTER POSITION | REGION INFORMATION | GROUP TABLE ACQUISITION INFORMATION |
|---|---|---|---|
| 0 | (x0, y0, z0) | Region0 | URL0 |
| 1 | (x1, y1, z1) | Region1 | URL1 |
| 2 | (x2, y2, z2) | Region2 | URL2 |

FIG. 7

| GROUP ID | GRAVITY CENTER POSITION | REGION INFORMATION | THREE-DIMENSIONAL OBJECT POSITION | GROUP TABLE ACQUISITION INFORMATION |
|---|---|---|---|---|
| 0 | (x0, y0, z0) | Region0 | (xs0, ys0, zs0) | URL0 |
| 1 | (x1, y1, z1) | Region1 | (xs1, ys1, zs1) | URL1 |
| 2 | (x2, y2, z2) | Region2 | (xs2, ys2, zs2) | URL2 |

FIG. 9

| GROUP ID | GRAVITY CENTER POSITION | REGION INFORMATION | THREE-DIMENSIONAL SPACE PARTITIONED REGION POSITION | GROUP TABLE ACQUISITION INFORMATION |
|---|---|---|---|---|
| 0 | (x0, y0, z0) | Region0 | (xc0, yc0, zc0) | URL0 |
| 1 | (x1, y1, z1) | Region1 | (xc1, yc1, zc1) | URL1 |
| 2 | (x2, y2, z2) | Region2 | (xc2, yc2, zc2) | URL2 |

FIG. 10

| CAMERA ID | EXTERNAL PARAMETER | EXTERNAL PARAMETER | TWO-DIMENSIONAL IMAGE DATA ACQUISITION INFORMATION | DEPTH IMAGE DATA ACQUISITION INFORMATION | PANORAMA FLAG | STEREO CAMERA INFORMATION | PRIORITY |
|---|---|---|---|---|---|---|---|
| 0 | K0 | R0 \| T0 | Video URL0 | Depth URL0 | False | 1 | 1 |
| 1 | K1 | R1 \| T1 | Video URL1 | Depth URL1 | True | 2 | 2 |
| 2 | K2 | R2 \| T2 | Video URL2 | Depth URL2 | False | 1 | 1 |
| 3 | K3 | R3 \| T3 | Video URL3 | Depth URL3 | False | 1 | 1 |

FIG. 17

| CAMERA ID | TWO-DIMENSIONAL IMAGE DATA ACQUISITION INFORMATION | DEPTH IMAGE DATA ACQUISITION INFORMATION |
|---|---|---|
| 0 | Video URL0 | Depth URL0 |
| 1 | Video URL1 | Depth URL1 |
| 2 | Video URL2 | Depth URL2 |
| 3 | Video URL3 | Depth URL3 |

FIG. 18

| CAMERA ID | TWO-DIMENSIONAL IMAGE DATA ACQUISITION INFORMATION | DEPTH IMAGE DATA ACQUISITION INFORMATION |
|---|---|---|
| 0 | Video URL0 | Depth URL0 |
| 2 | Video URL2 | Depth URL2 |
| 3 | Video URL3 | Depth URL3 |

FIG.20

| CLIENT PROPERTY | GLOBAL TABLE ACQUISITION INFORMATION |
|---|---|
| PC | URL0 |
| Portable terminal | URL1 |
| Thin client | URL2 |

INFORMATION PROCESSING APPARATUS AND INFORMATION PROCESSING METHOD

CROSS REFERENCE TO PRIOR APPLICATION

This application is a National Stage Patent Application of PCT International Patent Application No. PCT/JP2017/006988 (filed on Feb. 24, 2017) under 35 U.S.C. § 371, which claims priority to Japanese Patent Application No. 2016-046634 (filed on Mar. 10, 2016), which are all hereby incorporated by reference in their entirety.

TECHNICAL FIELD

The present disclosure relates to an information processing apparatus and an information processing method and, more particularly, to an information processing apparatus and an information processing method that are configured to efficiently acquire information for use in generating three-dimensional data from two-dimensional image data.

BACKGROUND ART

A reproducing apparatus is known in which three-dimensional data is generated from the two-dimensional image data, depth image data, and so on taken with two or more cameras (refer to NPL 1 and 2, for example) and, from the three-dimensional data thus generated, the two-dimensional image data (hereafter referred to as free-viewpoint image data) of a free viewpoint that is one given virtual viewpoint is generated.

With such a reproducing apparatus, a walkthrough operation can be executed in which a viewing person can freely walk for viewing in a viewing space that is a virtual space corresponding to the three-dimensional data that can be generated from the two-dimensional image data, depth image data, and so on imaged with all cameras.

It should be noted that the depth image data denotes image data made up of depths indicative of a position of the depth direction (the direction perpendicular to an imaging surface) of a subject of each pixel. Further, the three-dimensional data denotes data made up of the three-dimensional positional information and two-dimensional image data of a three-dimensional subject.

The reproducing apparatus described above acquires the two-dimensional image data, depth image data, and so on taken with all cameras from a server so as to generate three-dimensional data in generating free-viewpoint image data.

CITATION LIST

Non Patent Literature

[NPL 1]
Saied Moezzi, Li-Cheng Tai, Philippe Gerard, "Virtual View Generation for 3D Digital Video," University of California, San Diego
[NPL 2]
Takeo Kanade and Peter Rander, P. J. Narayanan, "Virtualized Reality: Constructing Virtual Worlds from Real Scenes"

SUMMARY

Technical Problems

However, if a free viewpoint is a viewpoint for viewing a part of a large-scale viewing space, then the ratio of a virtual space corresponding to the three-dimensional data for use in generating free-viewpoint image data to the entire viewing space is small. Therefore, in this case, there is no point for the reproducing apparatus in acquiring the two-dimensional image data, depth image data, and so on all cameras for use in generating the three-dimensional data of the entire viewing space.

Therefore, the present disclosure addresses the above-identified and other problems associated with related-art methods and apparatuses and solves the addressed problems by providing capabilities of efficiently acquire the information for use in generating three-dimensional data form two-dimensional image data.

Solution to Problems

In carrying out the present disclosure and according to a first aspect thereof, there is provided an information processing apparatus. The information processing apparatus includes a grouping block configured to sort a plurality of cameras for acquiring two-dimensional image data into a plurality of groups, a group information generation block configured to generate group information related with each of the above-mentioned plurality of groups, and a camera information generation block configured to generate, for each of the above-mentioned groups, camera information for use in generating three-dimensional data from the above-mentioned two-dimensional image data acquired by the above-mentioned camera sorted into the above-mentioned group.

An information processing method according to the first aspect of the present disclosure corresponds to the information processing apparatus according to the first aspect of the present disclosure.

In the first aspect of the present disclosure, two or more cameras for acquiring two-dimensional image data are sorted into two or more groups, group information related with each of the above-mentioned two or more groups is generated, and camera information for use in generating three-dimensional data from the above-mentioned two-dimensional image data acquired by the above-mentioned camera sorted into the above-mentioned group is generate for each above-mentioned group.

In carrying out the present disclosure and according to a second aspect thereof, there is provided an information processing apparatus. The information processing apparatus includes a group selection block configured to select, when a plurality of cameras for acquiring two-dimensional image data are sorted into a plurality of groups, a predetermined group from the above-mentioned plurality of groups on the basis of group information related with the above-mentioned group, and a camera information acquisition block configured to acquire camera information for use in generating three-dimensional data from the above-mentioned two-dimensional image data acquired by the above-mentioned camera sorted into the above-mentioned predetermined group selected by the above-mentioned group selection block.

An information processing method according to the second aspect of the present disclosure corresponds to the above-mentioned information processing apparatus according to the second aspect of the present disclosure.

In the second aspect of the present disclosure, when a plurality of cameras for acquiring two-dimensional image data are sorted into a plurality of groups, a predetermined group from the above-mentioned plurality of groups is selected on the basis of group information related with the above-mentioned group and camera information for use in generating three-dimensional data from the above-mentioned two-dimensional image data acquired by the above-mentioned camera sorted into the above-mentioned predetermined group.

It should be noted that the information processing apparatuses according to the first aspect and the second aspect can be realized by making a computer execute programs.

Further, in order to realize the information processing apparatuses according to the first aspect and the second aspect, the programs to be executed by a computer can be provided by the transmission through transmission media or as recorded to recording media.

Advantageous Effects of Invention

According to the first aspect of the present disclosure, information can be generated. According to the first aspect of the present disclosure, information can be generated such that information for use in generating three-dimensional data from two-dimensional image data can be efficiently acquired.

Further, according the second aspect of the present disclosure, information can be acquired. According to the second aspect of the present disclosure, information for use in generating three-dimensional data from two-dimensional image data can be efficiently acquired.

It should be noted that the effects described here are not necessarily limited thereto, namely, any other effects described in the present disclosure can be obtained.

BRIEF DESCRIPTION OF DRAWINGS

FIG. 5 is a diagram illustrating a configurational example of a global table in the first sorting method.

FIG. 7 is a diagram illustrating a configurational example of a global table in the second sorting method.

FIG. 9 is a diagram illustrating a configurational example of a global table in the third sorting method.

FIG. 10 is a diagram illustrating an example of a group table.

FIG. 17 is a diagram illustrating a first example of an acquired data list.

FIG. 18 is a diagram illustrating a second example of an acquired data list.

FIG. 20 is a diagram illustrating an example of a client property table.

DESCRIPTION OF EMBODIMENTS

The following describes modes (hereafter referred to as embodiments) in which to practice the present disclosure. It should be noted that this description will be done in the following sequence.

1. First embodiment: information processing system (FIG. 1 through FIG. 19)
2. Second embodiment: information processing system (FIG. 20 through FIG. 23)
3. Third embodiment: computer (FIG. 24)

First Embodiment (A Configurational Example of the First Embodiment of an Information Processing System)

Figure 1:
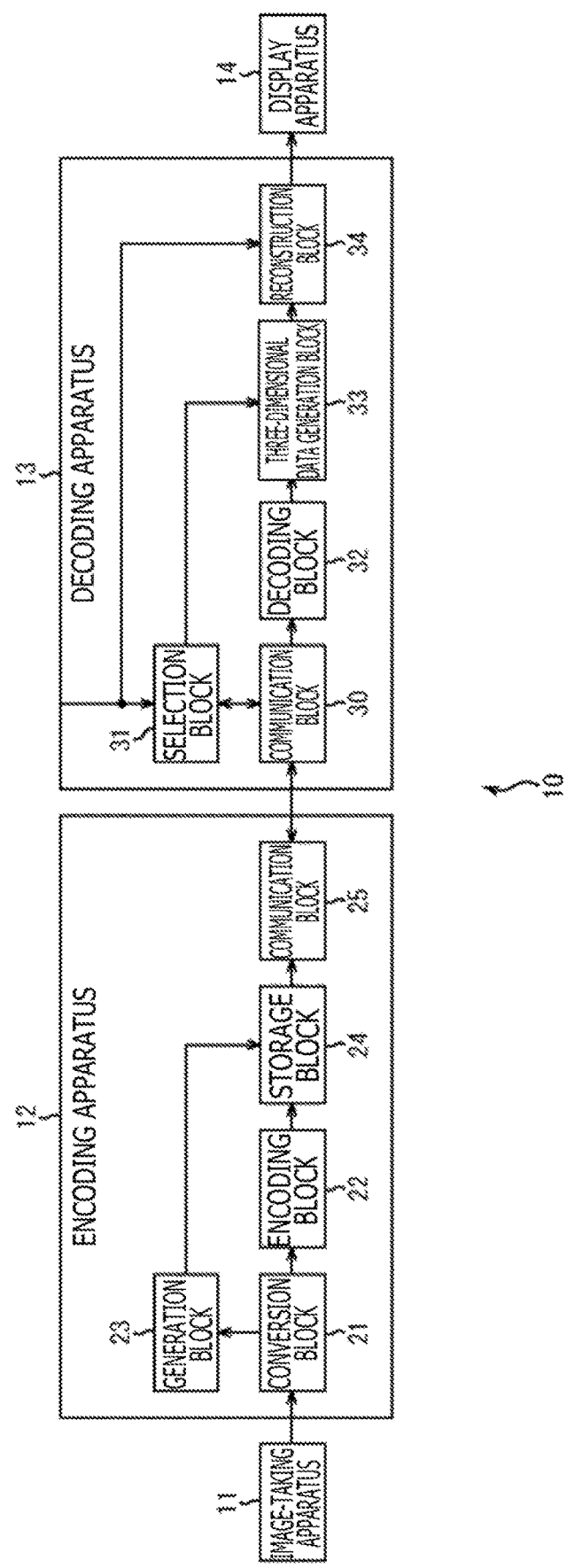
FIG. 1 is a block diagram illustrating a configurational example of a first embodiment of an information processing system to which the present disclosure is applied.

FIG. 1 is a block diagram illustrating a configurational example of the first embodiment of an information processing system to which the present disclosure is applied.

An information processing system 10 illustrated in FIG. 1 includes an image-taking apparatus 11, an encoding apparatus 12 (an information processing apparatus), a decoding apparatus 13 (an information processing apparatus), and a display apparatus 14. The information processing system 10 generates free-viewpoint image data by use of the two-dimensional image data and so on acquired by the image-taking apparatus 11 and displays the generated free-viewpoint image data.

To be more specific, the image-taking apparatus 11 of the information processing system 10 is made up of a multi-camera, a ranging measurement device, and an image processing block. The multi-camera of the image-taking apparatus 11 is made up of two or more cameras, each camera imaging the two-dimensional image data of a moving image of a subject at least partially common with other cameras. The ranging measurement device is installed on each camera, for example, thereby generating the depth image data having the same viewpoint of that of the camera.

The image processing block of the image-taking apparatus 11 executes modeling based on Visual Hull or the like by use of the two-dimensional image data and the depth image data of the viewpoint of each camera and an internal parameter and an external parameter of each camera, thereby creating a mesh. The image processing block generates, as the three-dimensional data of the subject, the geometric information (geometry) indicative of the link (polygon) between a three-dimensional position of each point (vertex) making up the created mesh and each point and the two-dimensional image data of this mesh.

For a method of generating the three-dimensional data in the image processing block, any one of methods cited in NPL 1, NPL 2, and so on can be employed. The image processing block supplies the three-dimensional data to the encoding apparatus 12.

The encoding apparatus 12 is made up of a conversion block 21, an encoding block 22, a generation block 23, a storage block 24, and a communication block 25.

The conversion block 21 of the encoding apparatus 12 assigns a camera ID unique to each of the two or more virtual cameras. The conversion block 21 sets an internal parameter and an external parameter of each virtual camera and a panorama flag indicative of whether to execute all-sky panorama imaging. The conversion block 21 supplies the internal parameter and the external parameter of each virtual camera and the panorama flag to the generation block 23 by relating these parameters and flag to the camera ID of each virtual camera. It should be noted that all-sky panorama imaging denotes taking an image of 360 degrees around in the horizontal direction and 180 degrees around in the vertical direction.

On the basis of the internal parameter and the external parameter of each virtual camera, the conversion block 21 generates the two-dimensional image data and the depth image data at the same time that are imaged by each virtual camera from the three-dimensional data supplied from the image-taking apparatus 11. It should be noted that "the same time" here denotes a time in a predetermined range that can be regarded as the same imaging time in generating the three-dimensional data and therefore need not always be a completely same time.

For a method of generating the two-dimensional image data and the depth image data in the conversion block 21, the method, among others, that is described in "Aiming at Ultimate Video Communication," Masayuki Tanimoto, The institute of Electronics, Information and Communication Engineers, Technology Research Reports, CS, Communication Schemes 110 (323), 73-78, 2010-11-25, etc. may be employed. The conversion block 21 supplies the two-dimensional image data and the depth image data of each virtual camera to the encoding block 22.

In the present description, it is assumed that the viewpoint of the two-dimensional image data and the viewpoint of the depth image data be the same; however, these viewpoints may be different from each other. Further, the virtual camera may or may not be the same as the camera of the image-taking apparatus 11.

The encoding block 22 encodes the two-dimensional image data and the depth image data of a virtual camera supplied from the conversion block 21. For an encoding method, any one of the AVC (Advanced Video Coding) method, the HEVC (High Efficiency Video Coding) method, and so on can be employed. The encoding block 22 supplies an encoded stream obtained as a result of the encoding to the storage block 24.

The generation block 23 sorts two or more virtual cameras into two or more groups on the basis of at least one of the internal parameter and the external parameter of each virtual camera supplied from the conversion block 21. The generation block 23 generates a global table in which the group information related with each of the two or more groups is registered.

Also, the generation block 23 generates, for each group, a group table in which the camera information for use in generating the three-dimensional image data from the two-dimensional image data to be imaged by a virtual camera sorted in each group is registered. The camera information includes an internal parameter, an external parameter, a panorama flag, and so on. The generation block 23 supplies the global table and the group table to the storage block 24.

The storage block 24 functions as a server and stores the global table and the group table supplied from the generation block 23 and the encoded stream supplied from the encoding block 22.

The communication block 25 reads the global table stored in the storage block 24 and transmits the global table to the decoding apparatus 13. Further, in response to a request by the decoding apparatus 13, the communication block 25 reads the group table and the encoded stream of a predetermined group from the storage block 24 and transmits the group table and the encoded stream to the decoding apparatus 13.

The decoding apparatus 13 is made up of a communication block 30, a selection block 31, a decoding block 32, a three-dimensional data generation block 33, and a reconstruction block 34. Free-viewpoint information for identifying a free viewpoint from a user viewing the display apparatus 14 is input in the decoding apparatus 13 to be supplied to the selection block 31 and the reconstruction block 34.

The communication block 30 of the decoding apparatus 13 receives the global table transmitted from the communication block 25 of the encoding apparatus 12 and supplies the received global table to the selection block 31. On the basis of the group table acquisition information for use in acquiring the group table of a predetermined group supplied from the selection block 31, the communication block 30 requests the communication block 25 for the group table of a predetermined group. In response to this request, the communication block 30 acquires the group table transmitted from the communication block 25 and supplies the acquired group table to the selection block 31.

Further, the communication block 30 requests the communication block 25 for an encoded stream on the basis of the acquisition data list that is a list registered with the stream acquisition information for use in acquiring an encoded stream supplied from the selection block 31. In response to this request, the communication block 30 acquires the encoded stream transmitted from the communication block 25 and supplies the acquired encoded stream to the decoding block 32.

On the basis of the free-viewpoint information and the global table that is supplied from the communication block 30, the selection block 31 selects a group sorted with a virtual camera corresponding to the camera information necessary for generating the free-viewpoint image data. The selection block 31 supplied, to the communication block 30, the group table acquisition information of the selected group registered as the group information in the global table.

Further, the selection block 31 selects camera information for use in generating three-dimensional data by the three-dimensional data generation block 33 from camera information registered in the group table supplied from the communication block 30. The selection block 31 supplies the external parameter and the internal parameter of the virtual camera that are included in the selected camera information to the three-dimensional data generation block 33. In addition, the selection block 31 supplies an acquired data list of the stream acquisition information included in the selected camera information to the communication block 30.

The decoding block 32, the three-dimensional data generation block 33, and the reconstruction block 34 reproduce the free-viewpoint image data and so on from the encoded stream supplied from the communication block 30.

To be more specific, the decoding block 32 decodes the encoded stream supplied from the communication block 30 by a scheme corresponding to the encoding scheme used in the encoding block 22. The decoding block 32 supplies the two-dimensional image data and the depth image data of each virtual camera that are obtained as a result of the decoding to the three-dimensional data generation block 33.

On the basis of the internal parameter and the external parameter supplied from the selection block 31, the three-dimensional data generation block 33 generates three-dimensional data from the two-dimensional image data and the depth image data of each virtual camera supplied from the decoding block 32 and supplies the generated three-dimensional data to the reconstruction block 34.

On the basis of the free-viewpoint information, the reconstruction block 34 generates the internal parameter and the external parameter of the virtual camera of the free viewpoint. On the basis of the internal parameter and the external parameter of the virtual camera of the free viewpoint, the reconstruction block 34 generates the free-viewpoint image data or the free-viewpoint image data and the depth image data of the free viewpoint from the three-dimensional data supplied from the three-dimensional data generation block 33 and supplies the generated data to the display apparatus 14.

The display apparatus 14 is made up of a two-dimensional head-mounted display, a two-dimensional monitor, a three-dimensional head-mounted display, a three-dimensional monitor, or the like. The display apparatus 14 displays a free-viewpoint image in a two-dimensional display manner on the basis of the free-viewpoint image data supplied from the three-dimensional data generation block 33 or a free-viewpoint image in a three-dimensional display manner on the basis of the free-viewpoint image data and the depth image data of the free-viewpoint.

(Configurational Example of the Generation Block)

Figure 2:
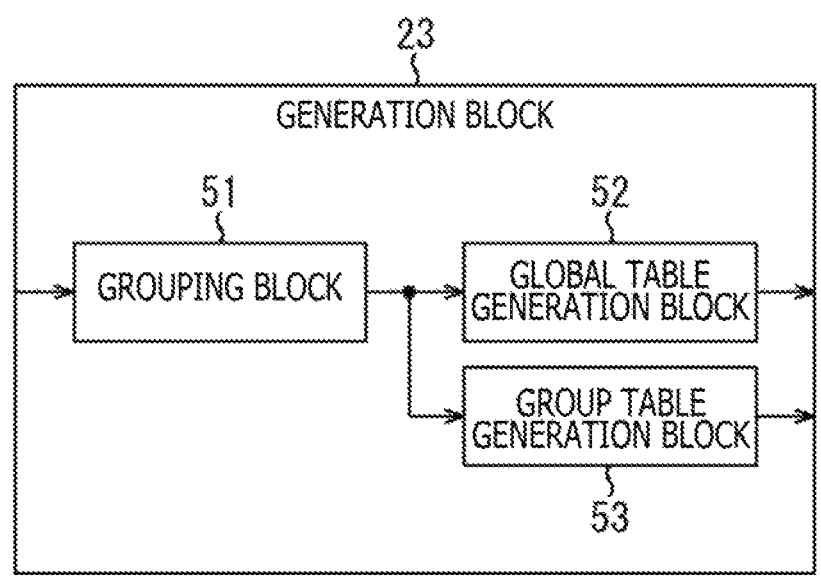
FIG. 2 is a block diagram illustrating a configurational example of a generation block.

FIG. 2 is a block diagram illustrating a configurational example of the generation block 23 illustrated in FIG. 1.

The generation block 23 illustrated in FIG. 2 is made up of a grouping block 51, a global table generation block 52, and a group table generation block 53.

The grouping block 51 of the generation block 23 sorts two or more virtual cameras into two or more groups on the basis of at least one of the internal parameter and the external parameter of each virtual camera supplied from the conversion block 21 illustrated in FIG. 1. The grouping block 51 generates the group information of each group and supplies the generated group information to the global table generation block 52.

In addition, the grouping block 51 supplies, for each group, the camera ID, the internal parameter, the external parameter, and the panorama flag of each virtual camera sorted in each group to the group table generation block 53.

The global table generation block 52 (the group information generation block) generates a global table on the basis of the group information of each group supplied from the grouping block 51. The global table generation block 52 supplies the global table to the storage block 24 illustrated in FIG. 1 so as to store the global table.

The group table generation block 53 (the camera information generation block) generates a group table for each group on the basis of the camera ID, the internal parameter, the external parameter, and the panorama flag of each of virtual cameras sorted into group supplied from the grouping block 51. The group table generation block 53 supplies the generated group table to the storage block 24 illustrated in FIG. 1 so as to store the group table.

(Description of the First Sorting Method for Virtual Cameras)

Figure 3:
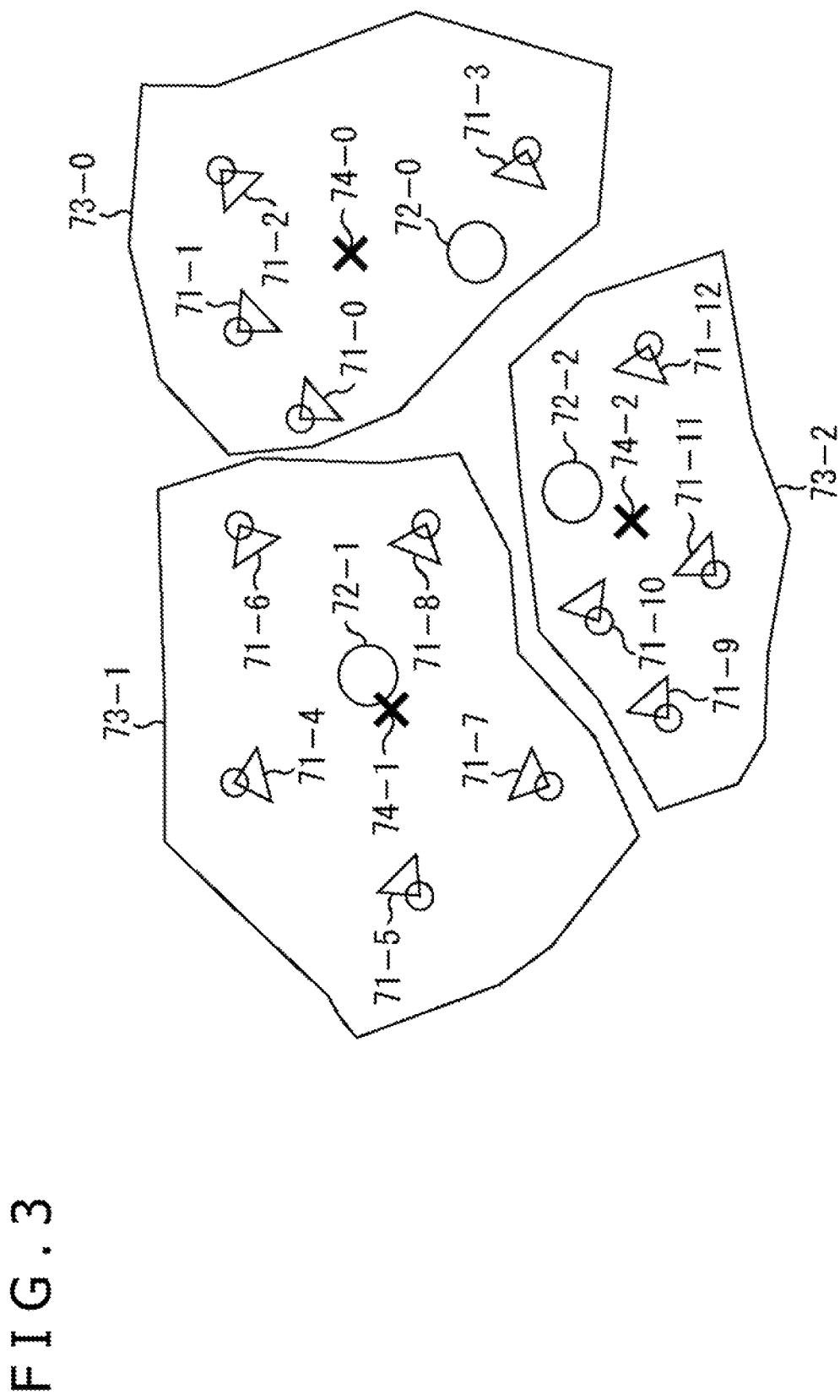
FIG. 3 is a diagram describing a first example of a first sorting method of a virtual camera.
Figure 4:
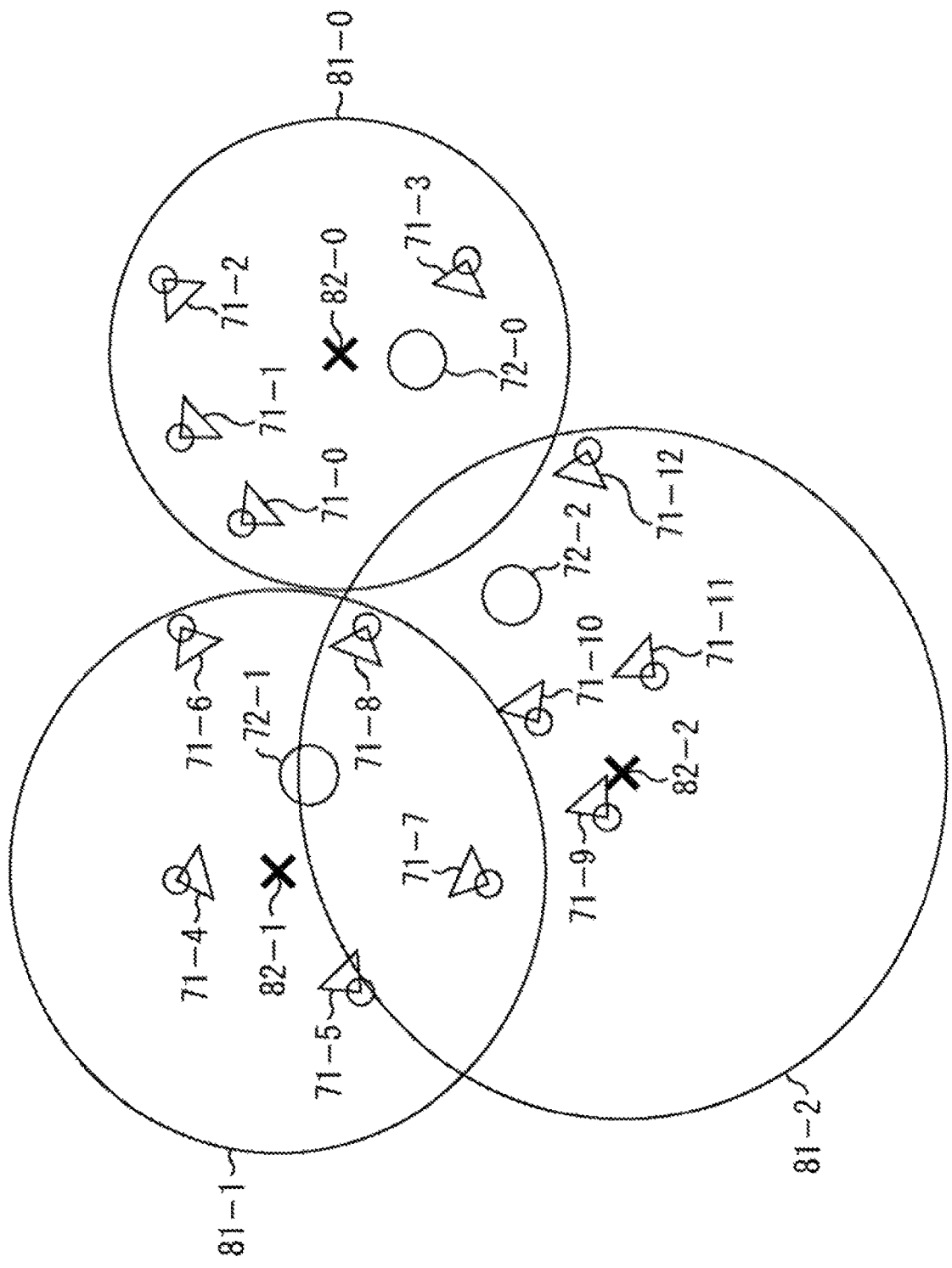
FIG. 4 is a diagram describing a second example of the first sorting method of a virtual camera.

FIG. 3 and FIG. 4 are diagrams describing the first sorting method for virtual cameras to be executed by the grouping block 51 illustrated in FIG. 2.

In the examples illustrated in FIG. 3 and FIG. 4, three three-dimensional objects 72-0 through 72-2 are taken by 13 virtual cameras 71-0 through 71-12 as main subjects. This holds true with FIG. 6 that will be described later. It should be noted that, in what follows, unless the virtual cameras 71-0 through 71-12 need be especially distinguished from each other, these virtual cameras are generically referred to as the virtual camera 71.

In this case, in the first sorting method, the grouping block 51 sorts the virtual cameras 71 into groups by use of k-means method (k-means method) or the like on the basis of a position indicated by the external parameter of the virtual camera 71 as illustrated in FIG. 3, for example. Consequently, the virtual camera 71 is sorted into any one of groups. In the example illustrated in FIG. 3, the grouping block 51 sorts four virtual cameras 71-0 through 71-3 into the first group, five virtual cameras 71-4 through 71-8 into the second group, and four virtual cameras 71-9 through 71-12 into the third group.

At this time, the grouping block 51 determines, for each group, regions 73-0 through 73-2 that include the positions of all virtual cameras 71 sorted in that group, thereby obtaining the gravity centers 74-0 through 74-2 of the regions 73-0 through 73-2. Any of the regions that are adjacent to each other may or may not touch each other.

With the first sorting method illustrated in FIG. 3, the virtual camera 71 is sorted in one of the groups; however, it is also practicable to sort at least one virtual camera 71 into two or more groups as illustrated in FIG. 4. In this case, for regions including the positions indicated by the external parameters of all virtual cameras 71, the grouping block 51 sets partial regions making up parts of the regions such that at least one of the partial regions is superimposed on another partial region. Then, for each partial region, the grouping block 51 sorts the virtual cameras 71 positioned in each partial region into one group.

In the example illustrated in FIG. 4, three circular partial regions 81-0 through 81-2 are set to the region including the positions of all virtual cameras 71. Then, the four virtual cameras 71-0 through 71-3 positioned in the partial region 81-0 are sorted into the first group and the five virtual cameras 71-4 through 71-8 positioned in the partial region 81-1 are sorted into the second group. Further, the six virtual cameras 71-7 through 71-12 positioned in the partial region 81-2 are sorted into the third group. Therefore, the virtual camera 71-7 and the virtual camera 71-8 are sorted into both the second group and the third group.

At this time, the grouping block 51 obtains the gravity centers (centers) 82-0 through 82-2 of the partial regions 81-0 through 81-2.

It should be noted that, in the examples illustrated in FIG. 3 and FIG. 4, the main subject to be taken with the virtual camera 71 is a three-dimensional object; however, it is also practicable that this subject is a three-dimensional space.

(Configurational Example of a Global Table in the First Sorting Method)

FIG. 5 is a diagram illustrating a configurational example of the global table in the first sorting method.

It should be noted that, in the example illustrated in FIG. 5, the number of groups is three and the group IDs are sequentially assigned to the groups from 0 on.

In the global table illustrated in FIG. 5, group information made up of the gravity center position, region information, and group table acquisition information of each group related with a group ID are registered.

The gravity center position is a three-dimensional coordinate indicative of the position of each gravity center (gravity centers 74-0 through 74-2 in the example illustrated in FIG. 3 and gravity centers 82-0 through 82-2 in the example illustrated in FIG. 4) of a region including the positions of all virtual cameras sorted into groups. In FIG. 5, the gravity center position of a group having group ID i (i=0, 1, 2) is written as three-dimensional coordinate ($x_i$, $y_i$, $z_i$).

The region information is the information indicative of regions (regions 73-0 through 73-2 in the example illustrated in FIG. 3 and the partial regions 81-0 through 81-2 in the example illustrated in FIG. 4) that include the positions of all virtual cameras sorted into groups. If the shape of a region is not circular as with the regions 73-0 through 73-2, the region information is the three-dimensional coordinate at each vertex of the region. On the other hand, if the shape of a region is circular, as with the partial regions 81-0 through 81-2, the region information is the information indicative of the radius of the region, for example. In the example illustrated in FIG. 5, the region information of a group with the group ID being i is written as Region i.

The group table acquisition information is information such as a URL (Uniform Resource Locator) for identifying the position of a global table inside the storage block 24, for example. In FIG. 5, the group table acquisition information with the group ID being i is written as URL i.

(Description of the Second Sorting Method for Virtual Cameras)

Figure 6:
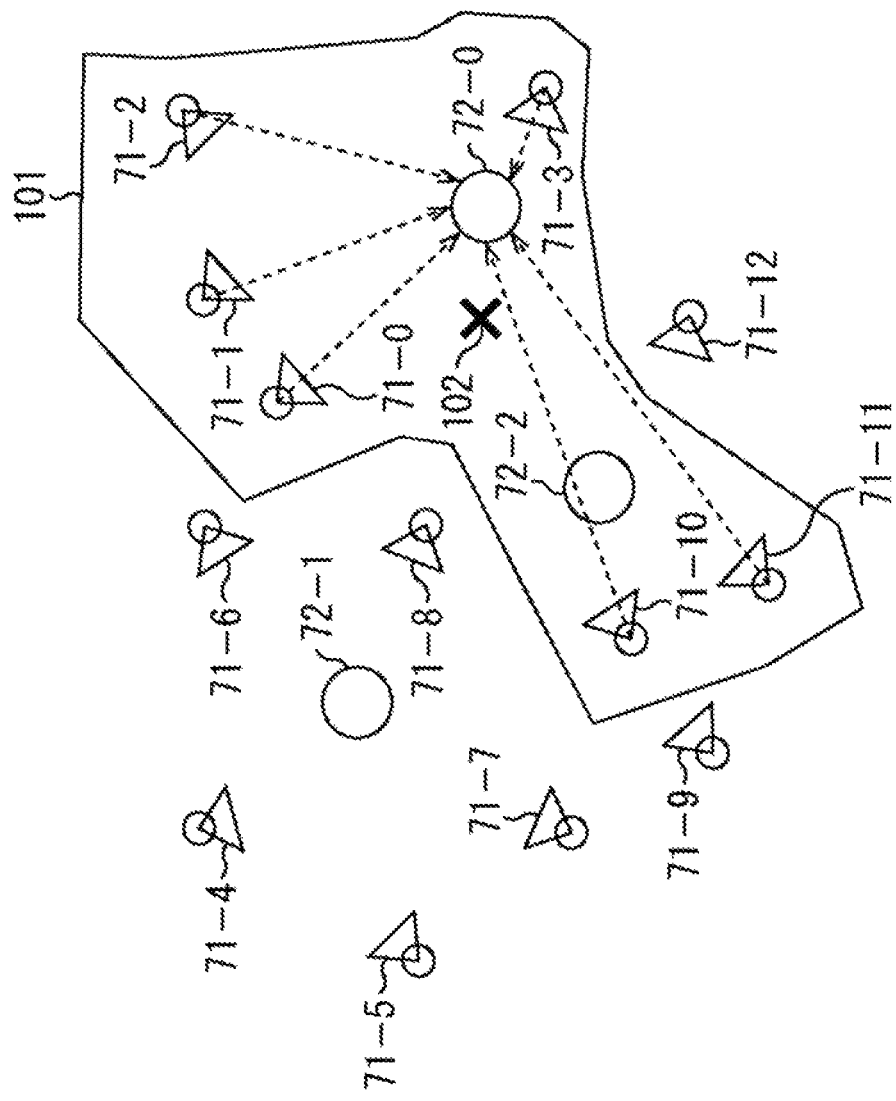
FIG. 6 is a diagram describing a second sorting method of a virtual camera.

FIG. 6 is a diagram describing the second sorting method for virtual cameras to be executed by the grouping block 51 illustrated in FIG. 2.

In the second sorting method, the conversion block 21 sets the internal parameter and the external parameter of each camera making up the image-taking apparatus 11 as the internal parameter and the external parameter of each virtual camera. That is, the internal parameter and the external parameter of each camera making up the image-taking apparatus 11 are the same as the internal parameter and the external parameter of each virtual camera.

Further, as illustrated in FIG. 6, for each of the three-dimensional objects 72-0 through 72-2, the grouping block 51 sorts the virtual cameras corresponding to the two-dimensional image data with the three-dimensional objects 72-0 through 72-2 being the subjects into groups. To be more specific, for each virtual camera, on the basis of the internal parameter and the external parameter, the grouping block 51 recognizes the three-dimensional object corresponding to the three-dimensional data generated by the three-dimensional data generation block 33 by use of the two-dimensional image data and so on. Then, for each three-dimensional object, the grouping block 51 sorts the virtual cameras corresponding to this three-dimensional object into groups.

In the example illustrated in FIG. 6, the grouping block 51 sorts the six virtual cameras 71-0 through 71-3, virtual camera 71-10, and virtual camera 71-11 into a group corresponding to the three-dimensional object 72-0. At this time, the grouping block 51 determines a region 101 including the positions of all virtual cameras 71 sorted into a group corresponding to the three-dimensional object 72-0 so as to obtain a gravity center 102 of the region 101.

In addition, as with the group corresponding to the three-dimensional object 72-0, the grouping block 51 sorts the virtual cameras 71 into the groups corresponding to the three-dimensional objects 72-1 and 72-2. Then, for each group, the grouping block 51 determines a region including the positions of all virtual cameras 71 sorted into that group so as to obtain the gravity center of that region.

(Configurational Example of a Global Table in the Second Sorting Method)

FIG. 7 is a diagram illustrating a configurational example of a global table in the second sorting method.

The configuration of the global table illustrated in FIG. 7 is different from the configuration illustrated in FIG. 5 in that a three-dimensional object position is further included in the group information.

That is, in the global table illustrated in FIG. 7, in relation with the group ID of each group, the three-dimensional coordinate at the center of three-dimensional objects that provide information indicative of three-dimensional objects (the three-dimensional objects 72-0 through 72-2 in the example illustrated in FIG. 6) corresponding to that group is registered as a three-dimensional object position. That is, the three-dimensional object position is the information indicative of the use of the two-dimensional image data and so on taken by the camera of the image-taking apparatus 11 corresponding to the virtual camera sorted in each group in generating the three-dimensional data of which of the three-dimensional objects. In FIG. 7, the three-dimensional object position of a particular group with the group ID being i (i=0, 1, 2) is written as a three-dimensional coordinate ($xs_i$, $ys_i$, $zs_i$).

(Description of the Third Sorting Method for Virtual Cameras)

Figure 8:
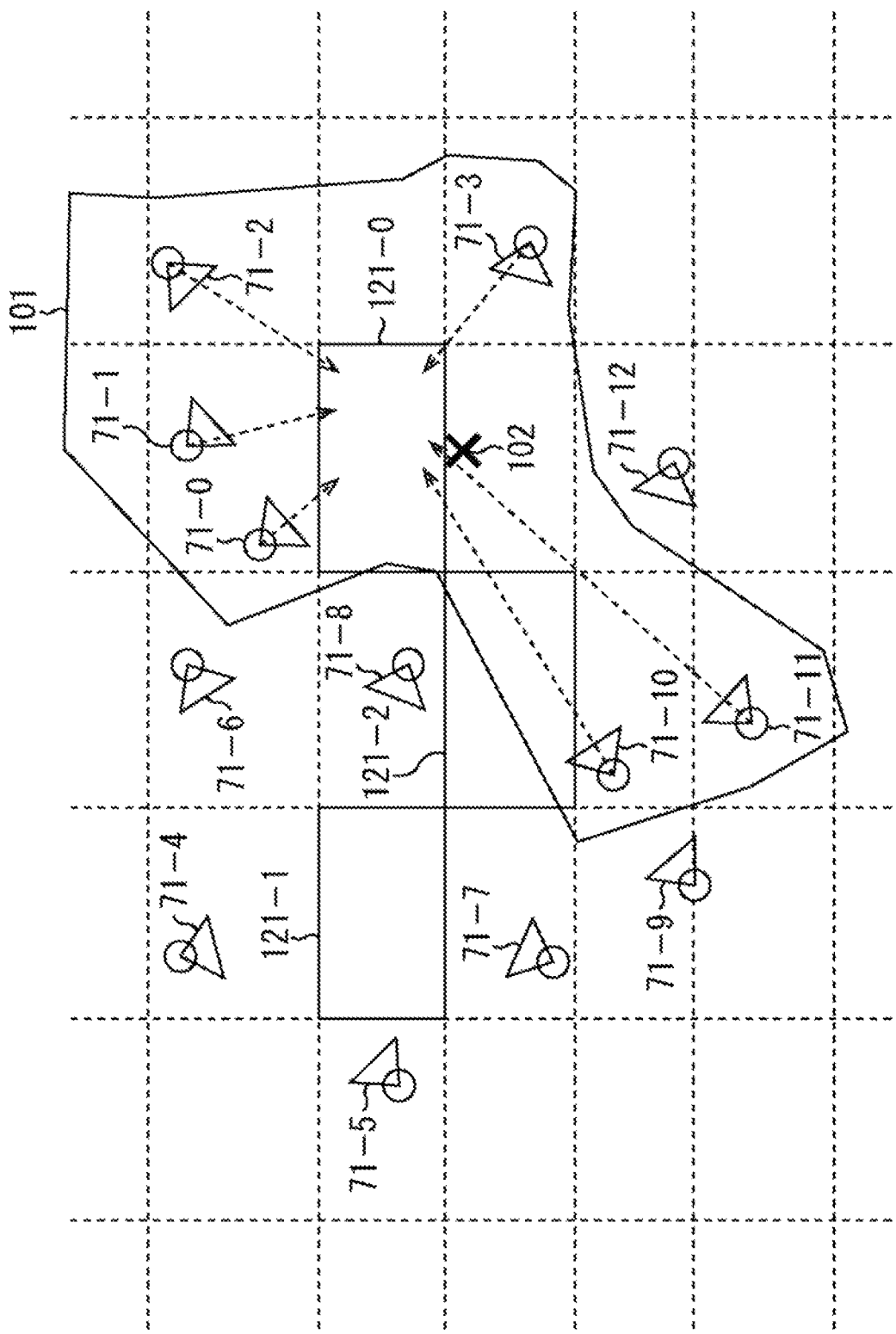
FIG. 8 is a diagram describing a third sorting method of a virtual camera.

FIG. 8 is a diagram describing the third sorting method for virtual cameras to be executed by the grouping block 51 illustrated in FIG. 2.

In the third sorting method, the main subject of virtual cameras is a three-dimensional space. Further, as with the second sorting method, the conversion block 21 sets the internal parameter and the external parameter of each of cameras making up the image-taking apparatus 11 as the internal parameter and the external parameter of each virtual camera. In the example illustrated in FIG. 8, the number of cameras making up the image-taking apparatus 11 is 13 and the conversion block 21 sets the internal parameters and the external parameters of the 13 virtual cameras 71-0 through 71-12.

Further, as illustrated in FIG. 8, the grouping block 51 partitions the three-dimensional space into three-dimensional space partitioned regions by grid or Voronoi. In the example illustrated in FIG. 8, the 13 virtual cameras 71 takes images of three three-dimensional space partitioned regions 121-0 through 121-2 as the major subjects. It should be noted that a three-dimensional object may be included in the three-dimensional space partitioned regions 121-0 through 121-2 taken by the virtual camera 71.

In addition, as illustrated in FIG. 8, for each of the three-dimensional space partitioned regions 121-0 through 121-2, the grouping block 51 sorts the virtual cameras corresponding to the two-dimensional image data with the three-dimensional space partitioned regions 121-0 through 121-2 being the subjects into groups. To be more specific, on the basis of the internal parameter and the external parameter for each virtual camera, the grouping block 51 recognizes a three-dimensional space partitioned region corresponding to the three-dimensional data generated by the three-dimensional data generation block 33 by use of two-dimensional image data and so on. Then, for each three-dimensional space partitioned region, the grouping block 51 sorts the virtual camera corresponding to this three-dimensional space partitioned region into groups.

In the example illustrated in FIG. 8, the grouping block 51 sorts six virtual cameras 71-0 through 71-3, virtual camera 71-10, and virtual camera 71-11 into the group corresponding to the three-dimensional space partitioned region 121-0. At this time, the grouping block 51 determines the region 101 including the positions of all virtual cameras 71 sorted into the group corresponding to the three-dimensional space partitioned region 121-0 so as to obtain the gravity center 102 of the region 101.

Further, as with the group corresponding to the three-dimensional space partitioned region 121-0, the grouping block 51 sorts the virtual cameras 71 into the groups corresponding to the three-dimensional space partitioned regions 121-1 and 121-2. Then, for each of groups, the grouping block 51 determines a region including the positions of all virtual cameras 71 sorted in that group so as to obtain the gravity center of that region.

(Configurational Example of a Global Table in the Third Sorting Method)

FIG. 9 is a diagram illustrating a global table in the third sorting method.

The configuration of the global table illustrated in FIG. 9 is different from the configuration illustrated in FIG. 5 in that the three-dimensional space partitioned region position is further included in the group information.

That is, in the global table illustrated in FIG. 9, in relation with the group ID of each group, the three-dimensional coordinate at the center of the three-dimensional space partitioned region that provides the information indicative of the three-dimensional space partitioned regions (the three-dimensional space partitioned regions 121-0 through 121-2 in the example illustrated in FIG. 8) corresponding to that group is registered as the three-dimensional space partitioned region position. That is, the three-dimensional space partitioned region position is the information indicative of the use of the two-dimensional image data and so on taken by the camera of the image-taking apparatus 11 corresponding to the virtual camera sorted in each group in generating the three-dimensional data of which of the three-dimensional space partitioned regions. In FIG. 9, the three-dimensional space partitioned region position of the group with the group ID being i (i=0, 1, 2) is written as a three-dimensional coordinate (xci, yci, zci).

(An Example of a Group Table)

FIG. 10 is a diagram illustrating an example of a group table that is generated by the group table generation block 53 illustrated in FIG. 2.

As illustrated in FIG. 10, in a group table, in relation with the camera ID of each virtual camera sorted in each group corresponding to this group table, the internal parameter, the external parameter, the stream acquisition information, the panorama flag, stereo camera information, and priority of this virtual camera are registered as camera information.

In the example illustrated in FIG. 10, the number of virtual cameras sorted into a group corresponding to the group table is four and the camera IDs of these virtual cameras are 0 through 3. Further, in FIG. 10, the internal parameter of the virtual camera with the camera ID being j (j=0, 1, 2, 3) is written as Kj and the external parameter is written as Rj|Tj.

The stream acquisition information is made up of two-dimensional image data acquisition information and depth image data acquisition information. The two-dimensional image data acquisition information is information for use in acquiring an encoded stream of the two-dimensional image data taken by a virtual camera; for example, information such as a URL for identifying the position of two-dimensional image data in the storage block 24. In FIG. 10, the two-dimensional image data acquisition information of the virtual camera with the camera ID being j is written as Video URL j.

The depth image data acquisition information is information for use in acquiring an encoded stream of the depth image data taken by a virtual camera; for example, information such as a URL for identifying the position of the depth image data in the storage block 24. In FIG. 10, the depth image data acquisition information of the virtual camera with the camera ID being j is written as Depth URL j.

The panorama flag is "True" if all-sky panorama image taking is executed; "False" is all-sky panorama image taking is not executed. In the example illustrated in FIG. 10, the panorama flag of the virtual cameras with the camera IDs being 0, 2, and 3 is "False"; the panorama flag of the virtual camera with the camera ID being 1 is "True."

The stereo camera information is registered if the two-dimensional image data of the own virtual camera is one of the two-dimensional image data for the left eye and the two-dimensional image data for the right eye that make up three-dimensional image data and a virtual camera (hereafter referred to as a pair camera) for taking the other two-dimensional image data exists. The stereo camera information is the camera ID of the pair camera.

The priority is the priority of the camera information of a virtual camera with respect to the generation of three-dimensional data. In the example illustrated in FIG. 10, as the priority gets higher, the priority gets smaller.

On the basis of the camera information of each virtual camera to be registered in the group table as described above, the selection block 31 of the decoding apparatus 13 selects the camera information for use in generated three-dimensional data by the three-dimensional data generation block 33 from the camera information of all registered virtual cameras.

(Description of the Processing by the Encoding Apparatus)

Figure 11:
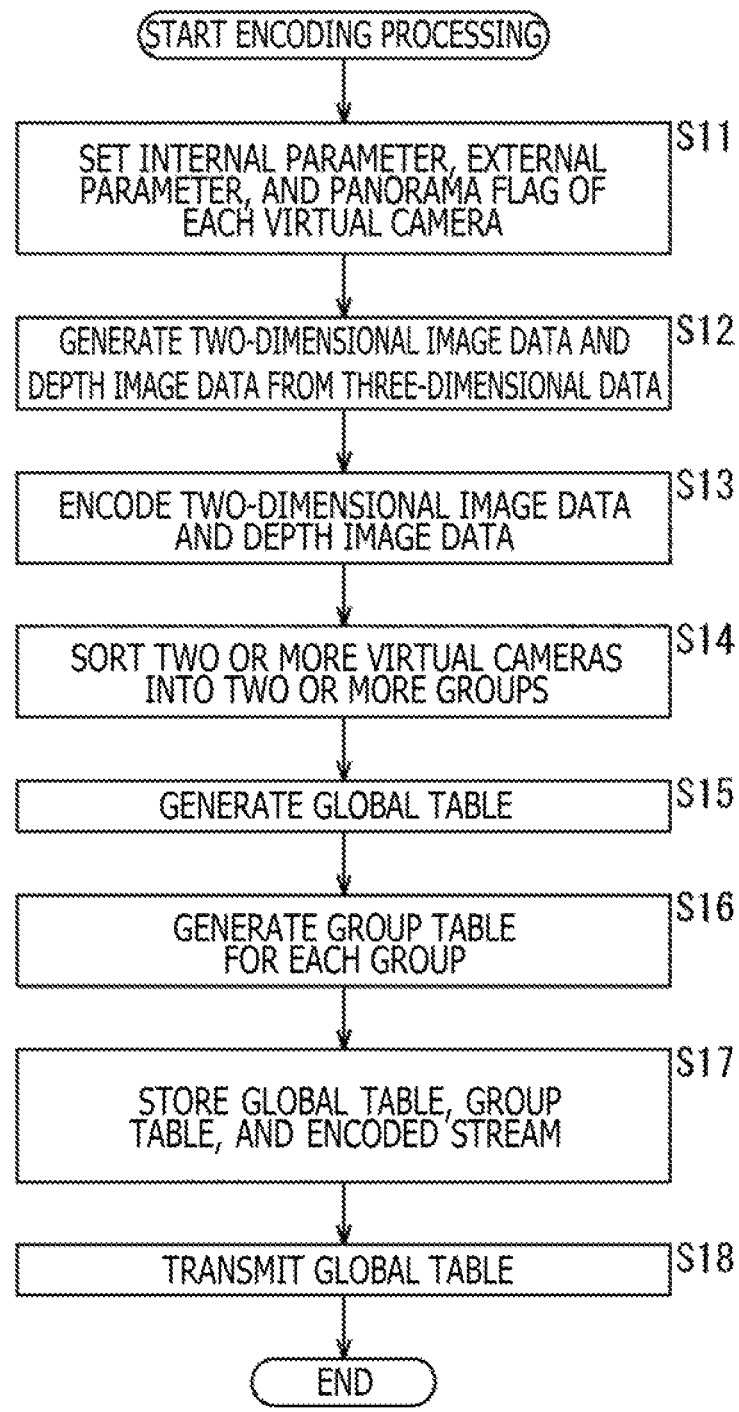
FIG. 11 is a flowchart describing encoding processing by an encoding apparatus.

FIG. 11 is a flowchart describing the encoding processing to be executed by the encoding apparatus 12 illustrated in FIG. 1. This encoding processing starts when three-dimensional data is supplied from the image-taking apparatus 11, for example.

In step S11 of FIG. 11, the conversion block 21 of the encoding apparatus 12 sets the internal parameter, the external parameter, and the panorama flag of each virtual camera. In relation with the camera ID assigned to each virtual camera, the conversion block 21 supplies the internal parameter, the external parameter, and the panorama flag of that virtual camera to the generation block 23.

In step S12, on the basis of the internal parameter and the external parameter of each virtual camera, the conversion block 21 generates the two-dimensional image data and the depth image data of the same time taken by each virtual camera from the three-dimensional data supplied from the image-taking apparatus 11. The conversion block 21 supplies the generated two-dimensional image data and the depth image data of each virtual camera to the encoding block 22.

In step S13, the encoding block 22 encodes the two-dimensional image data and the depth image data of the virtual camera supplied from the conversion block 21. The encoding block 22 supplies an encoded stream obtained as a result of the encoding to the storage block 24.

In step S14, on the basis of at least one of the internal parameter and the external parameter of each virtual camera supplied from the conversion block 21, the grouping block 51 (FIG. 2) of the generation block 23 sorts the two or more virtual cameras into two or more groups. The grouping block 51 generates the group information of each group and supplies the generated group information to the global table generation block 52.

Further, for each group, the grouping block 51 supplies the camera ID, the internal parameter, the external parameter, and the panorama flag of the virtual camera sorted in that group to the group table generation block 53.

In step S15, on the basis of the group information of each group supplied from the grouping block 51, the global table generation block 52 generates a global table. The global table generation block 52 supplies the generated global table to the storage block 24.

In step S16, on the basis of the camera ID, the external parameter, the internal parameter, and the panorama flag of the virtual camera sorted in each group that are supplied from the grouping block 51, the group table generation block 53 generates a group table for each group. The group table generation block 53 supplies the generated group table to the storage block 24 illustrated in FIG. 1.

In step S17, the storage block 24 stores the global table, the group table, and the encoded stream.

In step S18, the communication block 25 reads the global table stored in the storage block 24 and transmits the global table to the decoding apparatus 13, upon which the processing ends.

Subsequent to this encoding processing, in response to a request by the decoding apparatus 13, the communication block 25 reads the group table and the encoded stream of a predetermined group from the storage block 24 and transmits the group table and the encoded stream to the decoding apparatus 13.

It should be noted that, in the example illustrated in FIG. 11, the internal parameter, the external parameter, and panorama flag of each virtual camera are set for each three-dimensional data; however, it is also practicable to set these items of information for each three-dimensional data at a predetermined interval (a same scene interval, for example). In this case, the global table and the group table are generated for each three-dimensional data of a predetermined interval.

(Configurational Example of the Selection Block)

Figure 12:
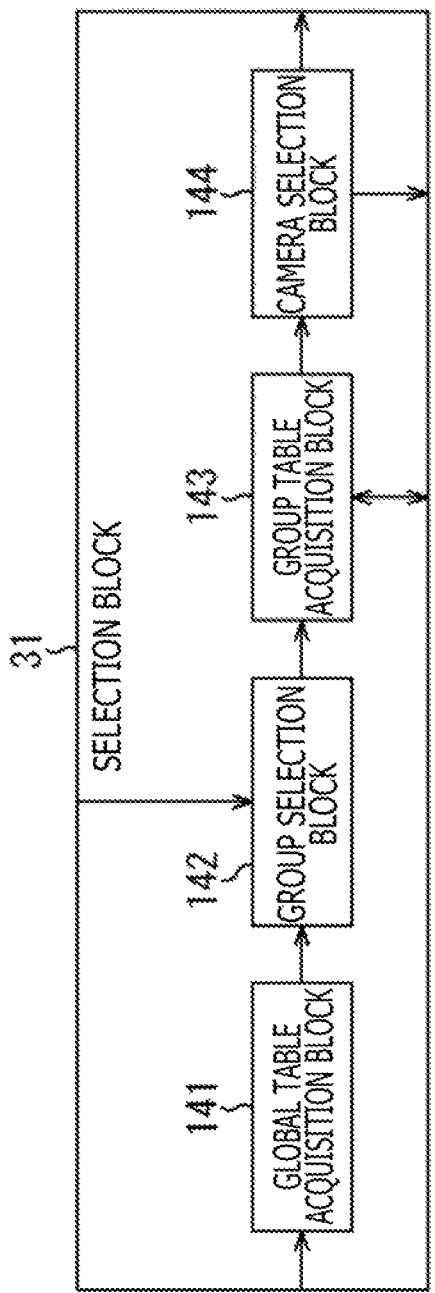
FIG. 12 is a block diagram illustrating a configurational example of a selection block.

FIG. 12 is a diagram illustrating a configurational example of the selection block 31 illustrated in FIG. 1.

The selection block 31 illustrated in FIG. 12 is made up of a global table acquisition block 141, a group selection block 142, a group table acquisition block 143, and a camera selection block 144.

The global table acquisition block 141 of the selection block 31 acquires the global table supplied from the communication block 30 and supplies the acquired global table to the group selection block 142.

On the basis of the free-viewpoint information and the group information registered in the global table supplied from the global table acquisition block 141, the group selection block 142 selects, from all groups, a group with the virtual camera corresponding to the camera information necessary for generating free-viewpoint image data. The selection block 31 supplies the group table acquisition information of the selected group registered in the global table to the group table acquisition block 143.

The group table acquisition block 143 supplies the group table acquisition information supplied from the group selection block 142 to the communication block 30. In addition, the group table acquisition block 143 (the camera information acquisition block) acquires, from the communication block 30, the group table sent from the encoding apparatus 12 on the basis of the group table acquisition information and supplies the acquired group table to the camera selection block 144.

The camera selection block 144 selects the camera information for use in generating the three-dimensional data by the three-dimensional data generation block 33 from the camera information registered in the group table supplied from the group table acquisition block 143. The camera selection block 144 supplies the internal parameter and the external parameter of the virtual camera included in the selected camera information to the three-dimensional data generation block 33.

In addition, the camera selection block 144 generates an acquisition data list registered with the camera ID, the two-dimensional image data acquisition information, and the depth image data acquisition information included in the selected camera information and supplies the generated acquisition data list to the communication block 30.

(Description of the First Group Selection Method)

Figure 13:
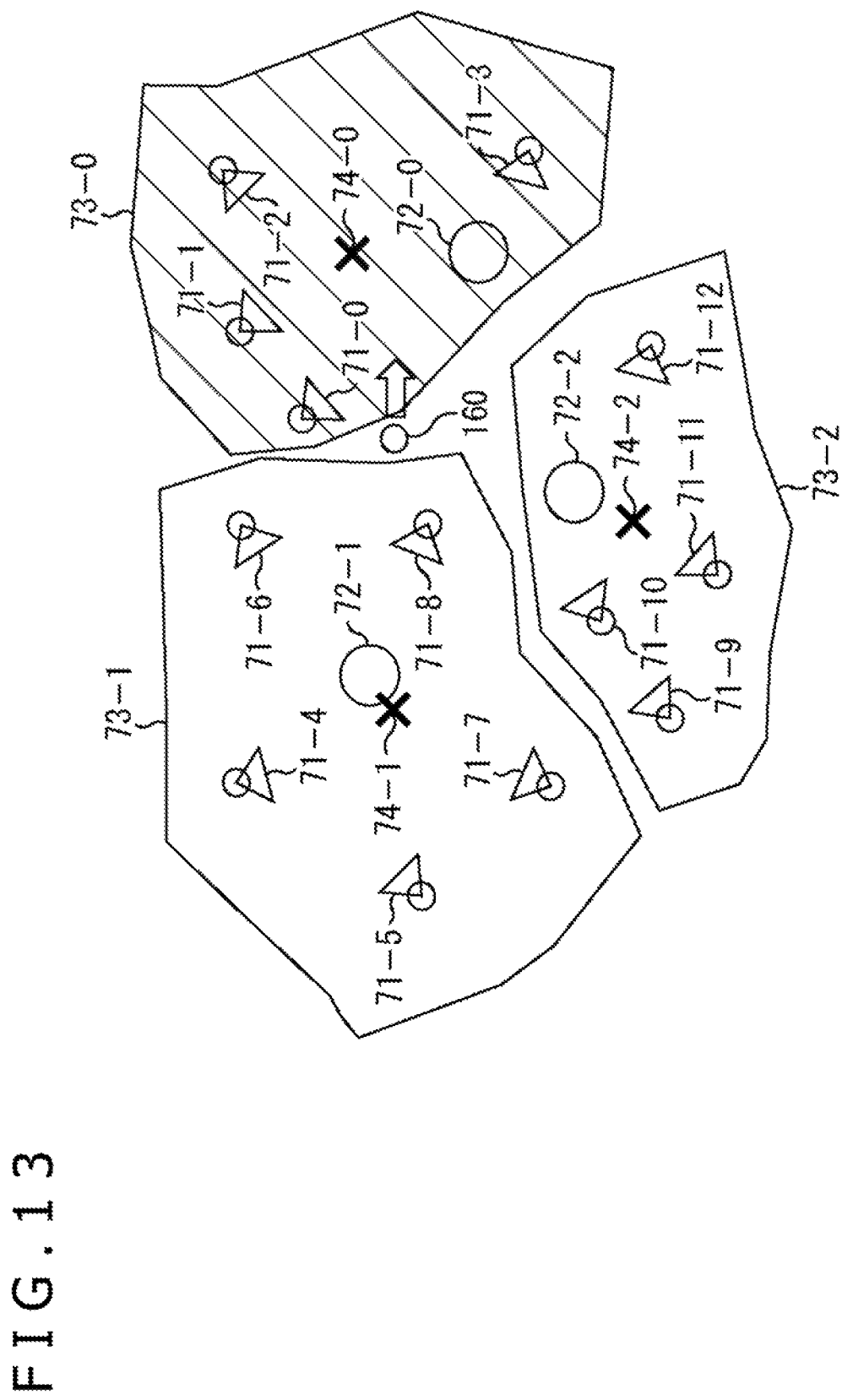
FIG. 13 is a diagram describing a selection method for selecting groups sorted in the first example of the first sorting method.

FIG. 13 is a diagram describing a group selection method to be executed by the group selection block 142 if a virtual camera is sorted into a group by the first sorting method described with reference to FIG. 3.

It should be noted that, with reference to FIG. 13, components similar to those previously described with FIG. 3 are denoted by the same reference symbols. The duplicate description is appropriately skipped.

In the case of FIG. 13, of the gravity centers 74-0 through 74-2 with which the gravity centers registered in the global table illustrated in FIG. 5 are indicative of positions, the group selection block 142 selects the group corresponding to the gravity center nearest from a position 160 of the free viewpoint identified by the free-viewpoint information, for example. In the example illustrated in FIG. 13, the gravity center nearest to the position 160 of free viewpoint is the gravity center 74-0. Therefore, the group selection block 142 selects the group having the group ID registered in the global table in relation with the gravity center position of a gravity center 74-0.

It should be noted that the group selection block 142 may select a group corresponding to the region information indicative of a region that includes the position of free viewpoint.

As described above, the group selection block 142 selects the group of the virtual camera 71 positioned in the proximity of the position 160 of free viewpoint. Therefore, the communication block 30 can efficiently acquire the camera information necessary for generating free-viewpoint image data by acquiring only the group table of this group.

That is, unlike the subject of free viewpoint, in the case of the subject of the virtual camera 71 existing at a position far from the position 160 of free viewpoint, the camera information of the virtual camera 71 is highly possible that this camera information is not used for generating the free-viewpoint image data. Therefore, the communication block 30 can efficiently acquire the camera information necessary for generating the free-viewpoint image data by acquiring only the group table of the group of the virtual camera positioned in the proximity of the position 160 of free viewpoint.

(Description of the Second Group Selection Method)

Figure 14:
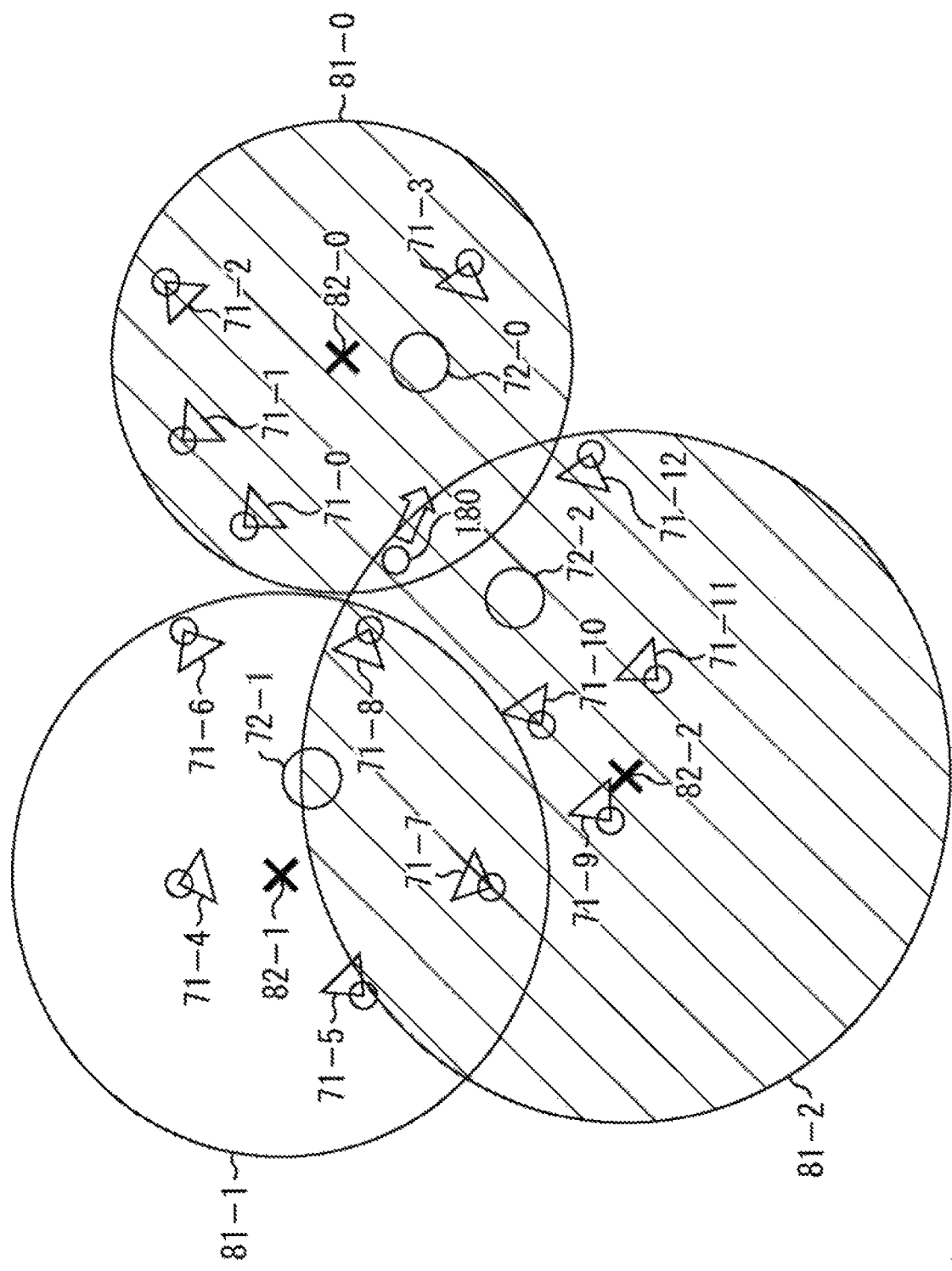
FIG. 14 is a diagram describing a selection method for selecting groups sorted in the second example of the first sorting method.

FIG. 14 is a diagram describing group selection method to be executed by the group selection block 142 if a virtual camera is sorted into a group by the first sorting method described with reference to FIG. 4.

It should be noted that, with reference to FIG. 14, components similar to those previously described with FIG. 4 are denoted by the same reference symbols. The duplicate description is appropriately skipped.

In the case of FIG. 14, of partial regions 81-1-0 through 81-2 indicated by the region information registered in the global table illustrated in FIG. 5, the group selection block 142 selects the group corresponding to the partial region nearest from a position 180 of free viewpoint identified by the free-viewpoint information, for example. In the example illustrated in FIG. 14, the position 180 of free viewpoint includes the partial region 81-0 and the partial region 81-2. Therefore, the group selection block 142 selects the group having the group ID registered in the global table in relation with the region information of the partial region 81-0 and the partial region 81-2.

Like the case of FIG. 13, in the case of FIG. 14, the group selection block 142 selects the group of the virtual camera 71 positioned in the proximity of the position 180 of free viewpoint. Therefore, the communication block 30 can efficiently acquire the camera information necessary for generating the free-viewpoint image data.

(Description of the Third Group Selection Method)

Figure 15:
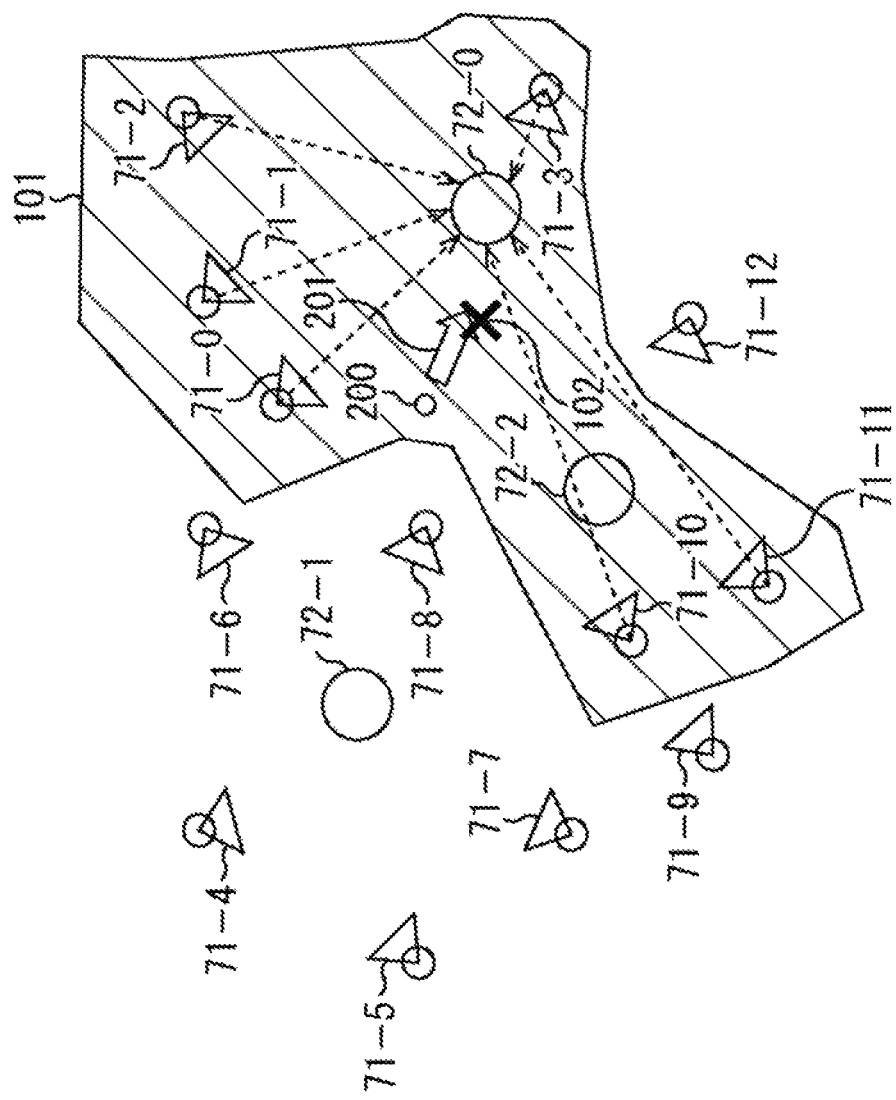
FIG. 15 is a diagram describing a selection method for selecting groups sorted by the second sorting method.

FIG. 15 is a diagram describing a group selection method to be executed by the group selection block 142 if a virtual camera is sorted into a group by the second sorting method described with reference to FIG. 6.

It should be noted that, with reference to FIG. 15, components similar to those previously described with FIG. 6 are denoted by the same reference symbols. The duplicate description is appropriately skipped.

In the case of FIG. 15, on the basis of a position 200 and a direction 201 of free viewpoint identified by free-viewpoint information, the group selection block 142 selects a three-dimensional object that becomes a subject (positioned inside the view angle of free viewpoint) in an image of free viewpoint from the three-dimensional objects 72-0 through 72-2 indicated by a three-dimensional object position registered in the global table illustrated in FIG. 7, for example. Then, the group selection block 142 selects the group corresponding to the selected three-dimensional object. In the example illustrated in FIG. 15, a position 200 of free viewpoint is positioned at the upper left of the three-dimensional object 72-0 and a direction 201 is in the lower right direction. Therefore, the group selection block 142 selects the group having the group ID registered in the global table in relation with the three-dimensional object position of the three-dimensional object 72-0.

As described above, the group selection block 142 selects the group of the virtual camera 71 corresponding to the two-dimensional image data used for generating by the image-taking apparatus 11 the three-dimensional data of the three-dimensional object 72-0 that becomes a subject in the image of free viewpoint. Therefore, the communication block 30 can efficiently acquire the camera information necessary for generating the three-dimensional data for use in generating free-viewpoint image data by acquiring only the group table of this group.

(Description of the Fourth Group Selection Method)

Figure 16:
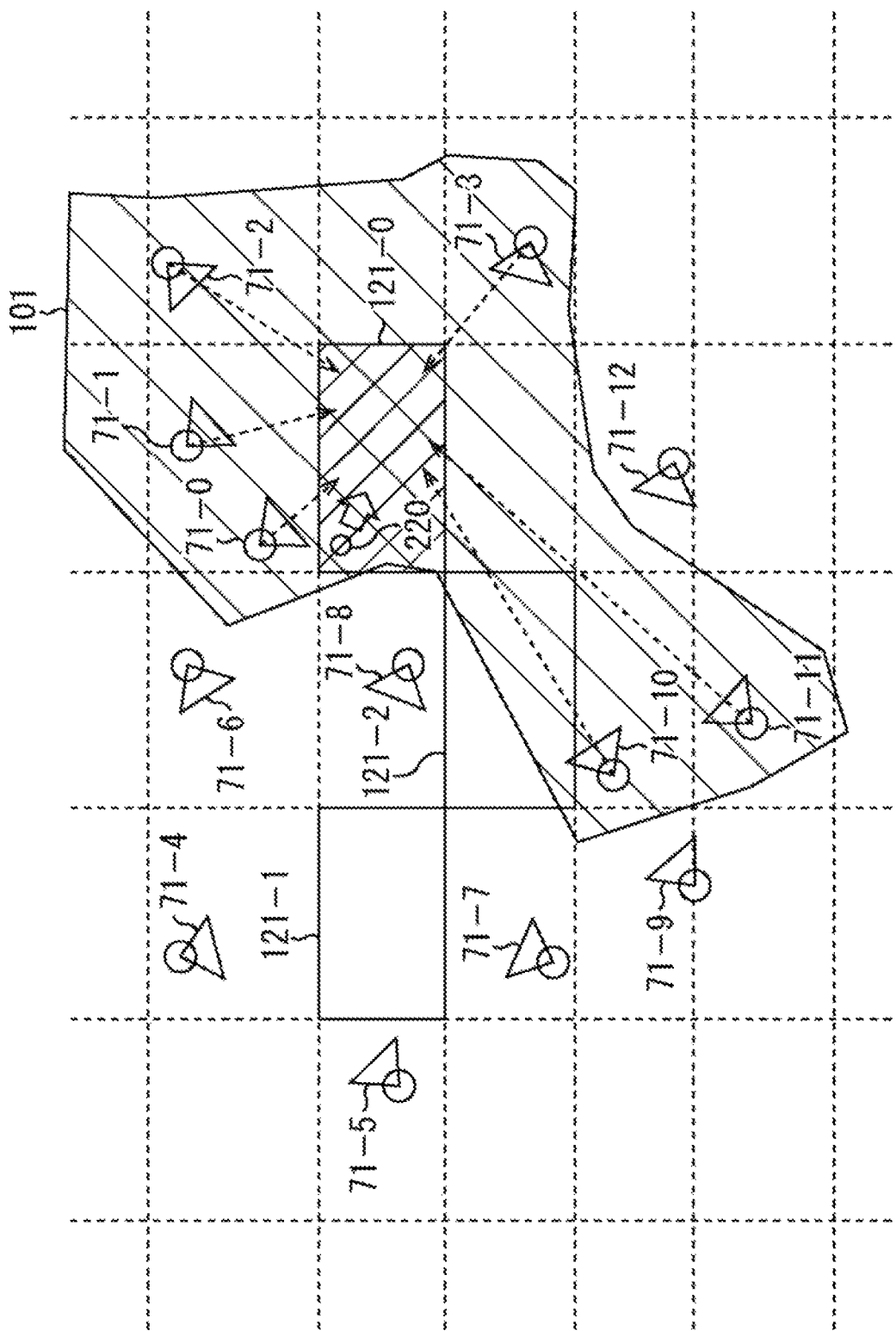
FIG. 16 is a diagram describing a selection method for selecting groups sorted by the third sorting method.

FIG. 16 is a diagram describing a group selection method to be executed by the group selection block 142 if a virtual camera is sorted into a group by the third sorting method described with reference to FIG. 8.

It should be noted that, with reference to FIG. 16, components similar to those previously described with FIG. 8 are denoted by the same reference symbols. The duplicate description is appropriately skipped.

In the case of FIG. 16, the group selection block 142 selects a group corresponding to a three-dimensional space partitioned region including a position 220 of free viewpoint specified by free-viewpoint information from the three-dimensional space partitioned regions 121-0 through 121-2 indicated by the three-dimensional space partitioned region position registered in the global table illustrated in FIG. 9, for example. In the example illustrated in FIG. 16, the position 220 of free viewpoint exists inside the three-dimensional space partitioned region 121-0. Therefore, the group selection block 142 selects the group having the group ID registered in the global table in relation with the three-dimensional space partitioned region position of the three-dimensional space partitioned region 121-0.

As described above, the group selection block 142 selects the group of the virtual camera 71 corresponding to the two-dimensional image data used for generating by the image-taking apparatus 11 the three-dimensional data of the three-dimensional space partitioned region 121-0 including the position 220 of free viewpoint. Therefore, the communication block 30 can efficiently acquire the camera information necessary for generating the three-dimensional data for use in generating free-viewpoint image data by acquiring only the group table of this group.

(Example of an Acquired Data List)

FIG. 17 and FIG. 18 are diagrams illustrating examples of acquired data lists that are generated by the camera selection block 144 illustrated in FIG. 12.

If the processing capacities of the decoding apparatus 13 are comparatively high or the rapidness of processing is not given much importance and the group table illustrated in FIG. 10 is supplied from the group table acquisition block 143, then the camera selection block 144 selects all camera information registered in the group table as the camera information for use in generating three-dimensional data by the three-dimensional data generation block 33.

Then, the camera selection block 144 generates an acquired data list illustrated in FIG. 17 in which all camera IDs registered in the group table illustrated in FIG. 10 and the two-dimensional image data acquisition information and the depth image data acquisition information that correspond to these camera IDs are registered.

On the other hand, if the processing capacities of the decoding apparatus 13 is comparatively low or the rapidness are given importance, for example, then, of the all camera information registered in the group table in FIG. 10, the camera selection block 144 selects only the camera information having high priority as the camera information for use in generating the three-dimensional data by the three-dimensional data generation block 33. For example, the camera selection block 144 selects only the camera information of virtual cameras with the camera IDs having priority 1 being "0," "2," and "3."

Then, the camera selection block 144 generates an acquired data list illustrated in FIG. 18 in which camera ID "0," "2," and "3" and the two-dimensional image data acquisition information and the depth image data acquisition information that correspond to these camera IDs are registered.

(Description of the Processing by the Decoding Apparatus)

Figure 19:
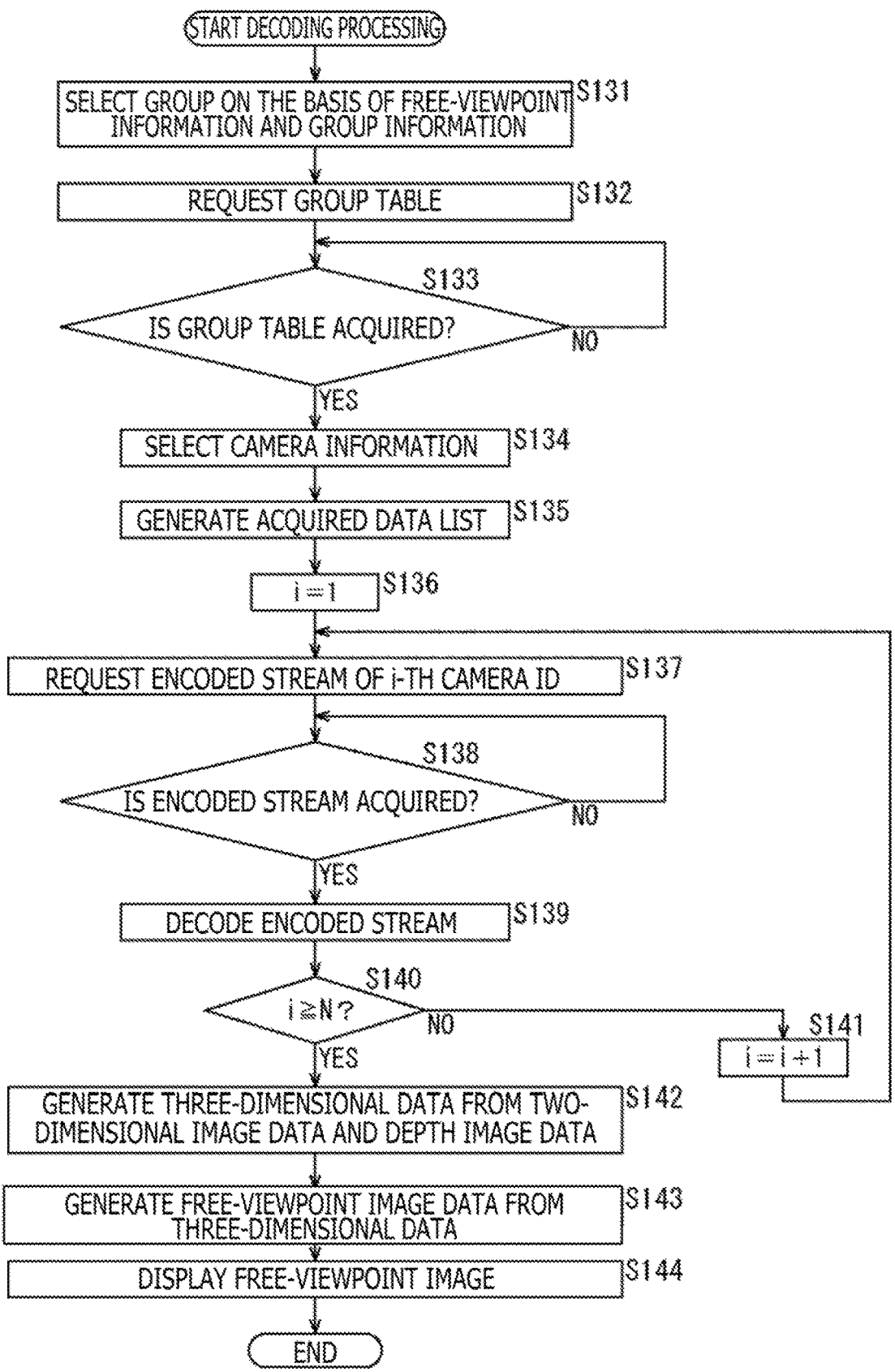
FIG. 19 is a flowchart indicative of decoding processing by a decoding apparatus.

FIG. 19 is a flowchart describing the decoding processing to be executed by the decoding apparatus 13 illustrated in FIG. 1. This decoding processing starts after acquiring, by the communication block 30, the global table corresponding to an encoded stream to be processed and supplying this global table to the group selection block 142 through the global table acquisition block 141 (FIG. 12).

In step S131 in FIG. 19, on the basis of the free-viewpoint information and the group information registered in the global table, the group selection block 142 of the decoding apparatus 13 selects a group in which the virtual cameras corresponding to the camera information necessary for generating free-viewpoint image data are sorted. The group selection block 142 supplies the group table acquisition information of the selected group registered in the global table to the communication block 30 through the group table acquisition block 143.

In step S132, on the basis of the group table acquisition information, the communication block 30 requests the communication block 25 for the group table. In step S133, the communication block 30 determines whether the group table transmitted from the communication block 25 in response to that request has been acquired.

If the group table is found not acquired yet in step S133, then the processing is kept in a wait state until the group table is acquired. On the other hand, if the group table is found acquired in step S133, then the communication block 30 supplies the acquired group table to the camera selection block 144 through the group table acquisition block 143. Then, the processing goes to step S134.

In step S134, the camera selection block 144 selects the camera information for use in generating the three-dimensional data by the three-dimensional data generation block 33 from the camera information registered in the group table supplied from the group table acquisition block 143. The camera selection block 144 supplies the internal parameter and the external parameter of the virtual camera included in the selected camera information to the three-dimensional data generation block 33.

In step S135, the camera selection block 144 generates an acquired data list in which the camera ID, the two-dimensional image data acquisition information, and the depth image data acquisition information included in the camera information selected in step S134 are registered and supplies the generated acquired data list to the communication block 30.

In step S136, the communication block 30 sets count value i to 1. In step S137, on the basis of the two-dimensional image data acquisition information and the depth image data acquisition information corresponding to the i-th camera ID from the beginning registered in the acquired data list, the communication block 30 requests the communication block 25 for the encoded stream of the virtual camera having the i-th camera ID.

In step S138, the communication block 30 determines whether the encoded stream of the two-dimensional image data and the depth image data of the virtual camera having the i-th camera ID transmitted from the communication block 25 in response to that request has been acquired. If the encoded stream of the virtual camera having the i-th camera ID is found not yet acquired in step S138, then the processing is kept in a wait state until the encoded stream is acquired.

On the other hand, if the encoded stream of the virtual camera having the i-th camera ID is found acquired in step S138, then the communication block 30 supplies the acquired encoded stream to the decoding block 32.

Next, in step S139, the decoding block 32 decodes the encoded stream supplied from the communication block 30. The decoding block 32 supplies the two-dimensional image data and the depth image data of the virtual camera acquired as a result of the decoding to the three-dimensional data generation block 33.

In step S140, the communication block 30 determines whether count value i is equal to or higher than the number of camera IDs N registered in the acquired data list. If count value i is found lower than number N in step S140, then the processing goes to step S141.

In step S141, the communication block 30 increments count value i by one and returns the processing to step S137. Then, the processing operations of steps S137 through S141 are repeated until count value i becomes equal to or higher than number N.

On the other hand, if count value i is found equal to or higher than number N in step S140, then the processing goes to step S142. In step S142, on the basis of the internal parameter and the external parameter supplied from the selection block 31, the three-dimensional data generation block 33 generates the three-dimensional data from the two-dimensional image data and the depth image data of the virtual camera supplied from the decoding block 32 and supplies the generated three-dimensional data to the reconstruction block 34.

In step S143, on the basis of the internal parameter and the external parameter of the virtual camera of free viewpoint, the reconstruction block 34 generates free-viewpoint image data from the three-dimensional data supplied from the three-dimensional data generation block 33. At this time, the reconstruction block 34 also generates the depth image data of free viewpoint in addition to the free-viewpoint image data as required.

In step S144, the reconstruction block 34 displays the free-viewpoint image on the display apparatus 14 in a two-dimensional manner by supplying the free-viewpoint image data generated in step S143 to the display apparatus 14. Alternatively, the reconstruction block 34 displays the free-viewpoint image on the display apparatus 14 in a three-dimensional manner by supplying the free-viewpoint image data and the depth image data of free viewpoint generated in step S144 to the display apparatus 14. Then, the processing ends.

As described above, in the information processing system 10, the encoding apparatus 12 generates a global table and a group table of each group. Therefore, the decoding apparatus 13 can select a predetermined group on the basis of the global table so as to acquire only the group table of the selected group.

Consequently, if the free viewpoint is a viewpoint for viewing a part of a large-scale viewing space, the decoding apparatus 13 need not wastefully acquire the camera information of a virtual camera unnecessary for generating free-viewpoint image data. Therefore, the decoding apparatus 13 can efficiently acquire camera information.

In addition, on the basis of the camera information registered in the acquired group table, the decoding apparatus 13 need not acquire the encoded stream of a virtual camera unnecessary for generating free-viewpoint image data by requesting the encoding apparatus 12 for an encoded stream. Therefore, the decoding apparatus 13 can efficiently acquire an encoded stream.

Second Embodiment (Example of a Client Property Table)

The configuration of the second embodiment of an information processing system to which the present disclosure is applied is different from the configuration of the information processing system 10 illustrated in FIG. 1 in that different global tables for different specifications (processing capacities) of the decoding apparatus 13 are generated and a client property table in which each global table is related with the processing capacities of the decoding apparatus 13 is generated. Therefore, in what follows, only a global table and a client property table are described.

FIG. 20 is a diagram illustrating an example of a client property table.

In the client property table illustrated in FIG. 20, global table acquisition information that is acquisition table of a global table is registered in relation with client properties. The client properties denote information indicative of the processing capacities of the decoding apparatus 13. In the example illustrated in FIG. 20, three items of information, "PC," "Portable terminal," and "Thin client," are registered as client properties in the client property table.

Client property "PC" is information indicative of comparatively high processing capacities of a personal computer or the like. Client property "Portable terminal" is information indicative of comparatively low processing capacities of a portable terminal or the like. Client property "Thin client" is information indicative of the processing capacities capable of generating only the free-viewpoint image data of a particular subject, namely, switch the viewpoints of a particular subject.

In the second embodiment, the generation block 23 generates a client property table and stores the generated client property table in the storage block 24 and the communication block 25 sends the stored client property table to the decoding apparatus 13. Further, in the second embodiment, since different global tables are prepared in accordance with the processing capacities of the decoding apparatus 13, the communication block 25 does not send a global table until requested by the decoding apparatus 13.

On the basis of the client property table acquired from the encoding apparatus 12 through the communication block 30, the global table acquisition block 141 recognizes the global table acquisition information corresponding to the client property indicative of the processing capacities of the decoding apparatus 13. On the basis of the recognized global table acquisition information, the global table acquisition block 141 requests the encoding apparatus 12 for the global table corresponding to the processing capacities of the decoding apparatus 13 through the communication block 30, thereby acquiring this global table.

(Description of the Sorting of Virtual Cameras for Each of the Client Properties)

Figure 21:
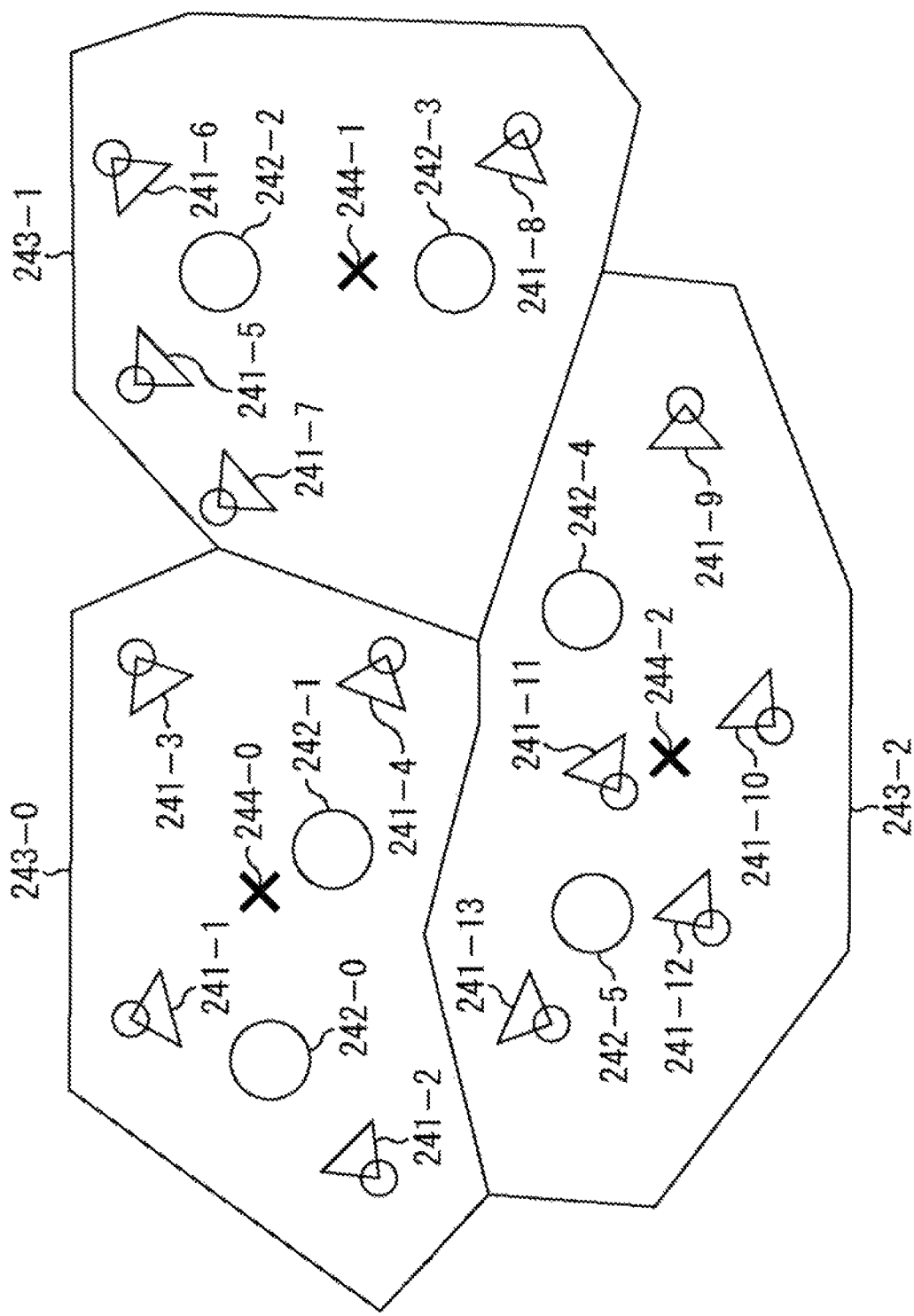
FIG. 21 is a diagram illustrating the sorting of a virtual camera to be executed in generating a global table corresponding to client property "PC."
Figure 22:
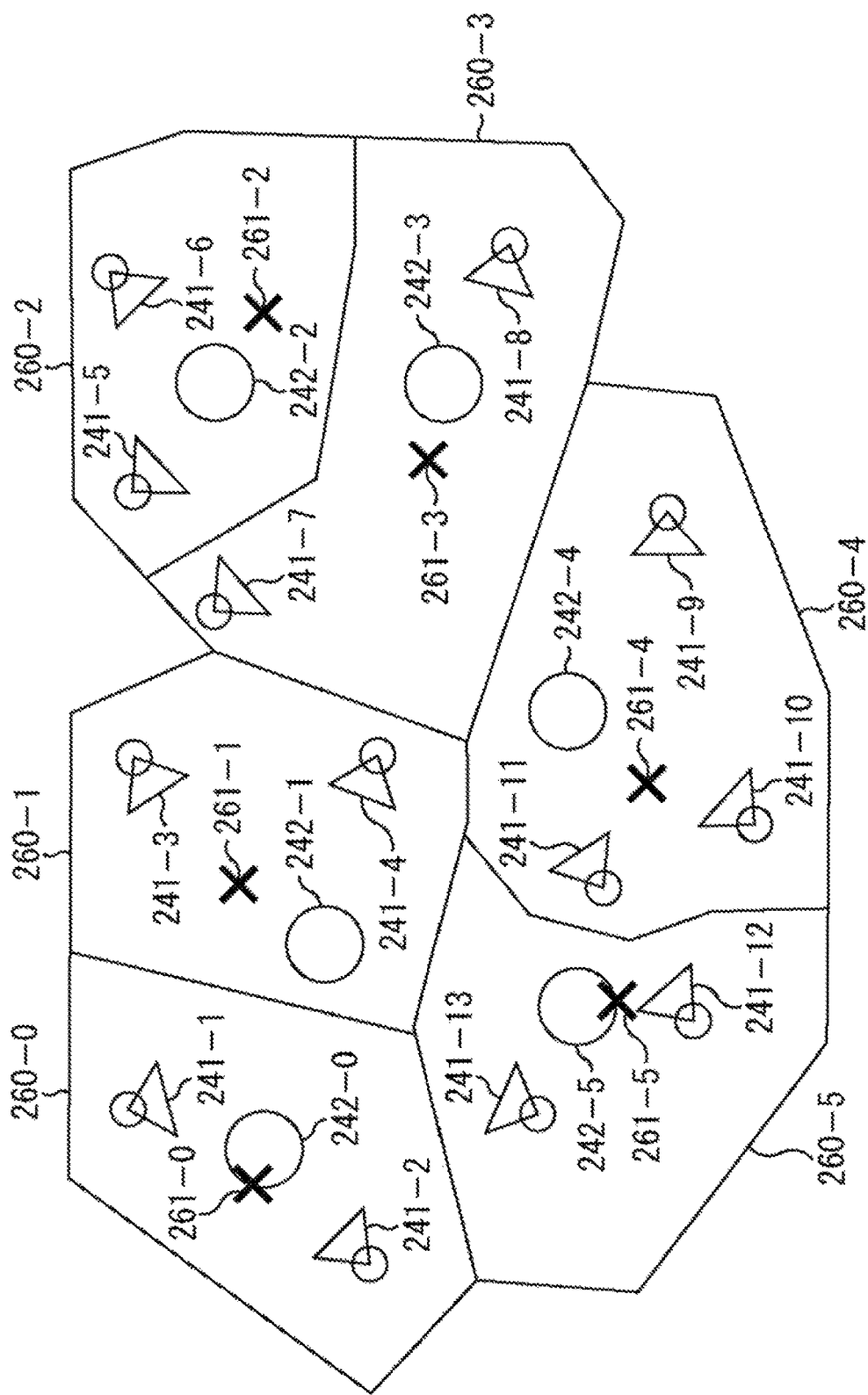
FIG. 22 is a diagram describing the sorting of a virtual camera to be executed in generating a global table corresponding to client property "Portable terminal."
Figure 23:
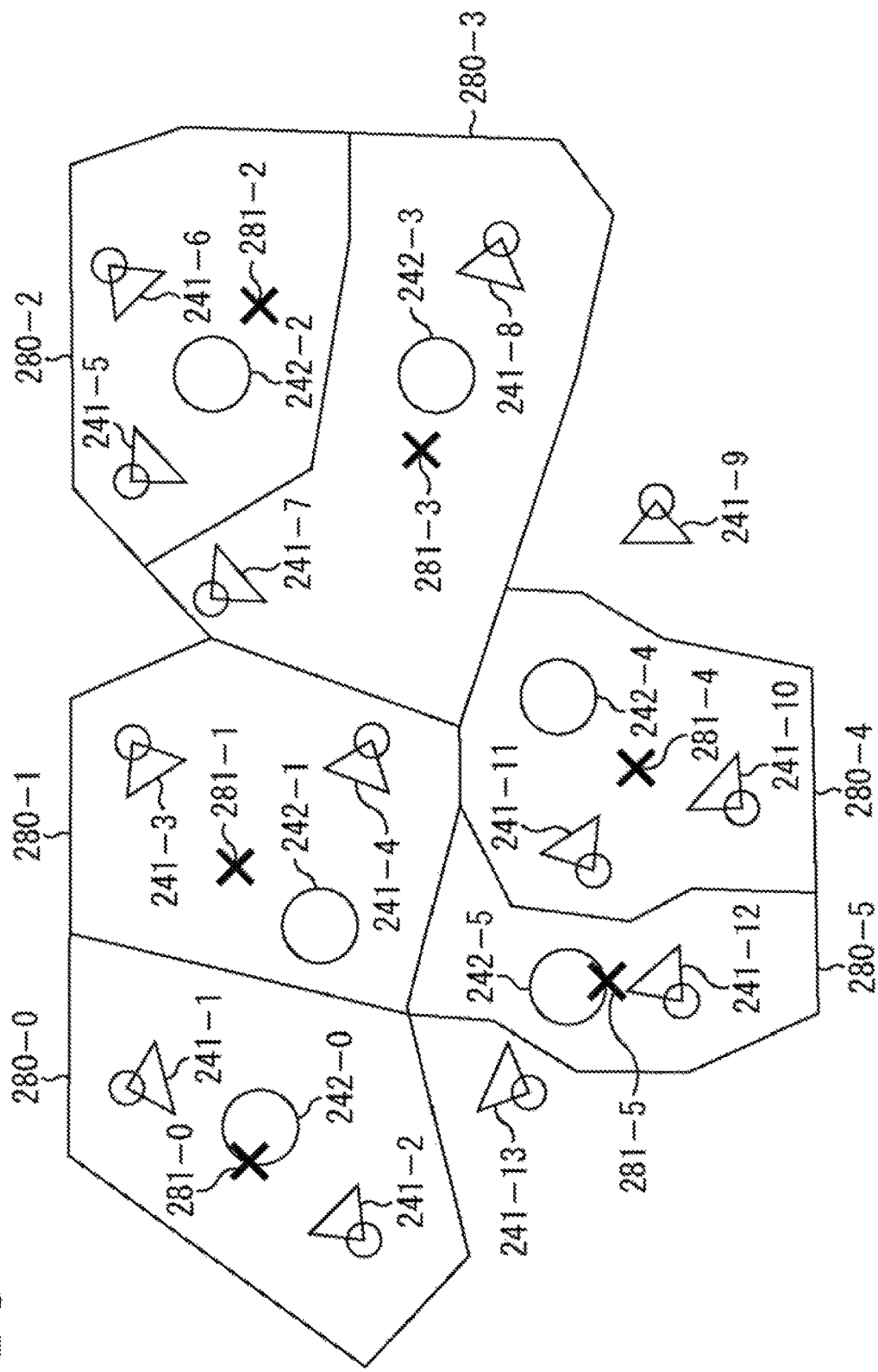
FIG. 23 is a diagram describing the sorting of a virtual camera to be executed in generating a global table corresponding to client property "Thin client."
Figure 24:
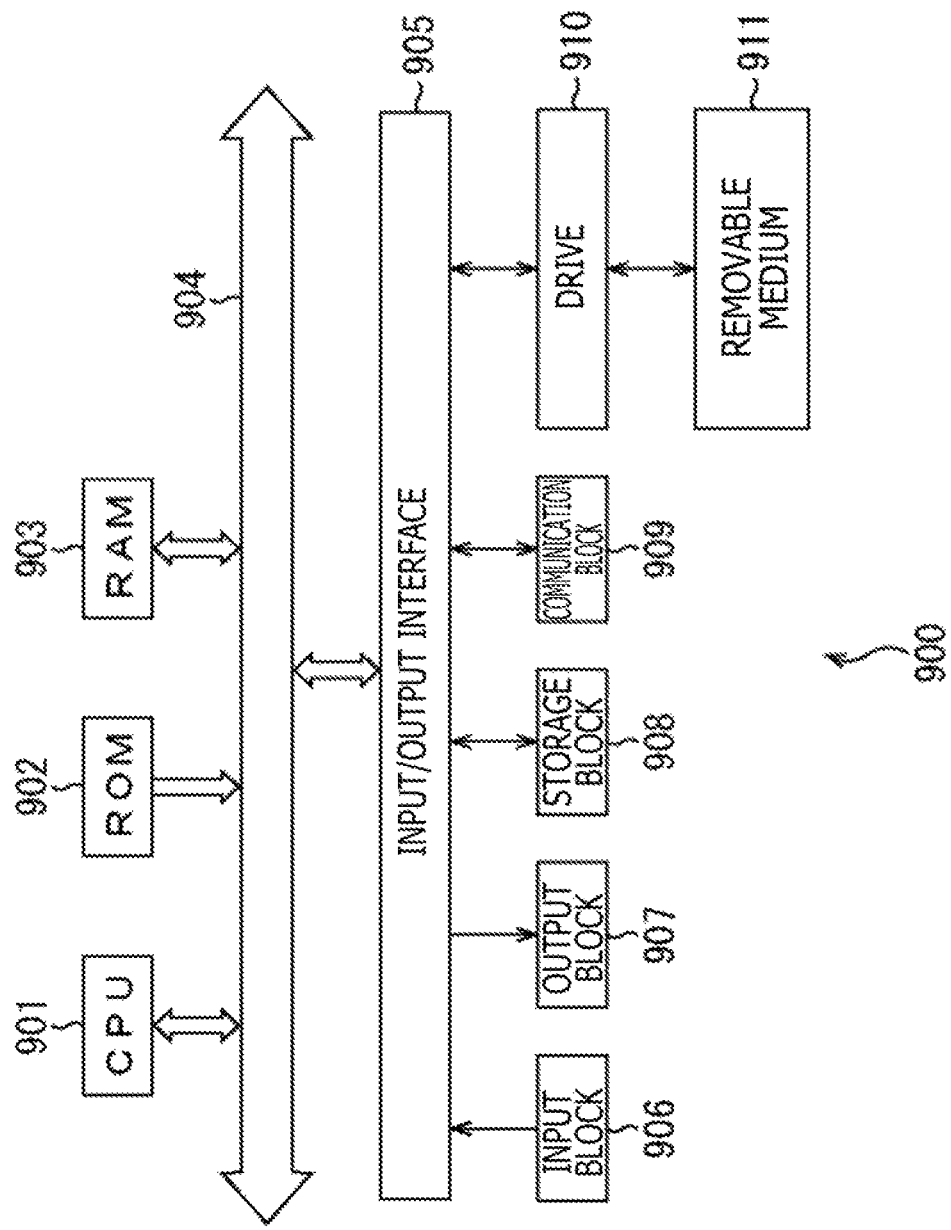
FIG. 24 is a block diagram illustrating a hardware configurational example of a computer.

FIG. 21 through FIG. 23 are diagrams describing the sorting of virtual cameras that is executed by the grouping block 51 at the time of generating a global table corresponding to client properties "PC," "Portable terminal," and "Thin client."

In the examples illustrated in FIG. 21 through FIG. 23, six three-dimensional objects 242-0 through 242-5 are taken by 13 virtual cameras 241-1 through 241-13 as main subjects. It should be noted that, in what follows, unless the virtual cameras 241-1 through 241-13 are especially necessary for distinction, these virtual cameras are generically referred to as the virtual camera 241. Likewise, the three-dimensional objects 242-0 through 242-5 are generically referred to as the three-dimensional object 242.

At the time of generating a global table corresponding to client property "PC," the grouping block 51 sorts the virtual cameras 241 into comparatively smaller number of groups by the first sorting method as illustrated in FIG. 21, for example.

In the example illustrated in FIG. 21, the grouping block 51 sorts four virtual cameras 241-1 through 241-4 into a first group, four virtual cameras 241-5 through 241-8 into a second group, and five virtual cameras 241-9 through 241-13 into a third group.

At this time, the global table generation block 52 determines regions 243-0 through 243-2 that include the positions of all virtual cameras 241 belong to the above-mentioned groups so as to obtain gravity centers 244-0 through 244-2 of the regions 243-0 through 243-2. Since the number of groups at the time of generating the global table corresponding to client property "PC" is comparatively small, two three-dimensional objects 242 are included in each of the regions 243-0 through 243-2 in the example illustrated in FIG. 21.

As described above, at the time of generating the global table corresponding to client property "PC," the number of groups is comparatively small. Therefore, the number of virtual cameras 241 sorted into one group is comparatively large. Therefore, the decoding apparatus 13 can generate free-viewpoint image data of high precision by use of the encoded stream of the comparatively large number of virtual cameras 241 sorted in a predetermined group.

That is, if the decoding apparatus 13 obtains the global table corresponding to client property "PC," the processing capacities of the decoding apparatus 13 are comparatively high. Therefore, the encoded stream of the comparatively large number of virtual cameras 241 can be processed. Therefore, in the global table corresponding to client property "PC," the number of virtual cameras 241 sorted into one group can be made large, thereby enabling the generation of the free-viewpoint image data of high precision.

By contrast, at the time of generating a global table corresponding to client property "Portable terminal," the grouping block 51 sorts the virtual cameras 241 into the comparatively large number of groups by the first sorting method as illustrated in FIG. 22, for example.

In the example illustrated in FIG. 22, the grouping block 51 sorts two virtual cameras 241-1 and 241-2 into a first group and two virtual cameras 241-3 and 241-4 into a second group. Further, the grouping block 51 sorts two virtual cameras 241-5 and 241-6 into a third group and two virtual cameras 241-7 and 241-8 into a fourth group. Still further, the grouping block 51 sorts three virtual cameras 241-9 through 241-11 into a fifth group and two virtual cameras 241-12 and 241-13 into a sixth group.

At this time, the global table generation block 52 determines regions 260-0 through 260-5 that include the positions of all virtual cameras 241 belonging to the above-mentioned groups so as to obtain the gravity centers 261-0 through 261-5 of the regions 260-0 through 260-5. Since the number of groups at the time of generating a global table corresponding to client property "Portable terminal" is comparatively large, only one three-dimensional object 242 is included in each of the regions 243-0 through 243-5 in the example illustrated in FIG. 22, for example.

As described above, at the time of generating the global table corresponding to client property "Portable terminal," the number of groups is comparatively large. Therefore, the number of virtual cameras 241 sorted in one group is comparatively small. Therefore, the decoding apparatus 13 can easily generate free-viewpoint image data by use of the encoded stream of the comparatively small number of virtual cameras 241 sorted into a predetermined group.

That is, if the decoding apparatus 13 acquires the global table corresponding to client property "Portable terminal," the processing capacities of the decoding apparatus 13 are comparatively low. Therefore, it is difficult to process an encoded streams of the comparatively large number of virtual cameras 241. Therefore, in the global table corresponding to client property "Portable terminal," the number of virtual cameras 241 to be sorted into one group can be made small, thereby enabling the mitigation of the load of the processing for generating free-viewpoint image data.

It should be noted that the configuration of the global table corresponding to client property "PC" and client property "Portable terminal" is similar to the above-mentioned configuration illustrated in FIG. 5, so that the description of the configuration of this corresponding global table is skipped.

Further, the sorting method for use in generating a global table corresponding to client property "PC" and client property "Portable terminal" may be the second or third sorting method rather than the first sorting method.

At the time of generating a global table corresponding to client property "Thin client," the grouping block 51 sorts, on the basis of the view angle of the virtual camera 241, the virtual cameras 241 with the ratio inside the view angle of each three-dimensional object 242 being equal to or higher than a threshold value into groups for each three-dimensional object 242 as illustrated in FIG. 23, for example.

In the example illustrated in FIG. 23, the grouping block 51 sorts the two virtual cameras 241-1 and 241-2 with the ratio inside the view angle of the three-dimensional object 242-0 being equal to or higher than a threshold value into the first group and the two virtual cameras 241-3 and 241-4 with the ratio inside the view angle of the three-dimensional object 242-1 being equal to or higher than the threshold value into the second group.

Further, the grouping block 51 sorts the two virtual cameras 241-5 and 241-6 with the ratio inside the view angle of the three-dimensional object 242-2 being equal to or higher than the threshold value into the third group and the two virtual cameras 241-7 and 241-8 with the ratio inside the view angle of the three-dimensional object 242-3 being equal to or higher than the threshold value into the fourth group.

Still further, the grouping block 51 sorts the two virtual cameras 241-10 and 241-11 with the ratio inside the view angle of the three-dimensional object 242-4 being equal to or higher than the threshold value into the fifth group and one virtual camera 241-12 with the ratio inside the view angle of the three-dimensional object 242-5 being equal to or higher than the threshold value into the sixth group. Therefore, the virtual cameras 241-9 and the virtual camera 241-13 are sorted in none of the first through sixth groups.

At this time, the global table generation block 52 determines the regions 280-0 through 280-5 that include the positions of all virtual cameras 241 belong to each group so as to obtain the gravity centers 281-0 through 281-5 of the regions 280-0 through 280-5.

As described above, at the time of generating the global table corresponding to client property "Thin client," the virtual camera 241 sorts, for each three-dimensional object 242 that is a subject, the virtual cameras 241 with the ratio inside the view angle of each three-dimensional object 242 being equal to or higher than the threshold value. Therefore, the decoding apparatus 13 can acquire only the encoded stream of the virtual camera 241 with the ratio inside the view angle of a predetermined subject being equal to or higher than the threshold value.

That is, if the decoding apparatus 13 acquires the global table corresponding to client property "Thin client," the decoding apparatus 13 generates only the free-viewpoint image data of a particular subject. Therefore, there is no need for the encoded stream of the virtual camera 241 with the ratio of the particular subject inside the view angle being lower than the threshold value. Therefore, in the global table corresponding to client property "Thin client," for each three-dimensional object 242 that is a subject, the virtual cameras 241 with the ratio inside the view angle of each three-dimensional object 242 being equal to or higher than the threshold value are sorted. Consequently, the decoding apparatus 13 can acquire only the encoded stream of the virtual camera 241 with the ratio of particular subjects inside the view angle being equal to or lower than the threshold value, the encoded stream being necessary for generating the free-viewpoint image data of the particular subjects.

It should be noted that the configuration of the global table corresponding to client property "Thin client" is the same as the above-mentioned configuration illustrated in FIG. 7, so that the description of this corresponding global table is skipped.

In the examples illustrated in FIG. 21 through FIG. 23, the three-dimensional subject to be taken by the virtual camera 241 is a three-dimensional object; however, this subject may be a three-dimensional space. Further, of the regions 243-0 through 243-3 (regions 260-0 through 260-5, regions 280-0 through 280-5), those adjacent to each other may or may not touch each other.

In the second embodiment, the global table is generated for each processing capacity of the decoding apparatus 13; however, it is also practicable to generate the global table for each resolution or bit rate of each encoded stream. In this case, for each resolution or bit rate, only the virtual camera corresponding to the encoded stream having that resolution or bit rate is sorted into two or more groups and the global table for these two or more groups is generated.

Third Embodiment (Description of a Computer to which the Present Disclosure is Applied)

The above-mentioned sequence of processing operations can be executed by hardware or software. If the sequence of processing operations is executed by software, the programs making up that software are installed on a computer. Here, the computer includes a computer in which dedicated hardware is assembled or a general-purpose computer on which various types of programs are installed so as to execute various types of functions, for example.

FIG. 24 is a block diagram illustrating a configurational example of the hardware of a computer by which the above-mentioned sequence of processing operations is executed by programs.

In a computer 900, a CPU (Central Processing Unit) 901, a ROM (Read Only Memory) 902, and a RAM (Random Access Memory) 903 are interconnected with a bus 904.

Further, an input/output interface 905 is connected to the bus 904. An input block 906, an output block 907, a storage block 908, a communication block 909, and a drive 910 are connected to the input/output interface 905.

The input block 906 is made up of a keyboard, a mouse, a microphone, and so on. The output block 907 is made up of a display, a speaker, and so on. The storage block 908 is made up of a hard disk drive, a nonvolatile memory, or the like. The communication block 909 is made up of a network interface and so on. The drive 910 drives a removable medium 911 such as magnetic disc, an optical disc, a magneto-optical disc, or a semiconductor memory.

In the computer 900 configured as described above, the CPU 901 loads a program stored in the storage block 908 into the RAM 903 via the input/output interface 905 and the bus 904 and executes this program, thereby executing the above-mentioned sequence of processing operations, for example.

Programs to be executed by the computer 900 (the CPU 901) can be provided as recorded to the removable medium 911 that is a package medium or the like. In addition, programs can be provided through wired or wireless transmission medium such as a local area network, the Internet, digital broadcasting satellite, and so on.

In the computer 900, programs can be installed in the storage block 908 via the input/output interface 905 by loading the removable medium 911 in which the programs are recorded onto the drive 910. Also, programs can be installed in the storage block 908 by receiving the programs at the communication block 909 via wired or wireless transmission medium. In addition, programs can be installed in the ROM 902 or the storage block 908 in advance.

It should be noted that the programs to be executed by the computer 200 may be those which are processed in a time series along a sequence described in the present description or those which are processed in parallel or with necessary timings such as an on-demand basis.

Further, in the present description, a system denotes an aggregation of two or more components (apparatuses, modules (parts), and so on) which may or may not be mounted in a same housing. Therefore, both two or more apparatuses mounted in separate housings and interconnected via a network and one apparatus in which two or more modules are mounted in one housing are systems.

Still further, the effects written in the present description are illustrative only and therefore not limited thereto; namely, there may be other effects.

The embodiments of the present disclosure are not limited to those described above; therefore, various changes and modifications may be made without departing from the gist of the present disclosure.

For example, the internal parameter and the external parameter registered in a group table may not be data themselves but may be information that is used for the acquisition of data.

Further, the global table, the group table, and the client property table may be configured in one table.

Still further, the present disclosure may also be applied to an information processing system that executes streaming based on MPEG-DASH.

It should be noted that the present disclosure may also take the following configuration.

(1)
An information processing apparatus including:
a grouping block configured to sort a plurality of cameras for acquiring two-dimensional image data into a plurality of groups;
a group information generation block configured to generate group information related with each of the plurality of groups; and
a camera information generation block configured to generate, for each of the groups, camera information for use in generating three-dimensional data from the two-dimensional data acquired by the camera sorted into the group.

(2)
The information processing apparatus according to (1) above, in which
the grouping block is configured to sort, for each processing capacity of an information processing apparatus for reproducing the two-dimensional image data, at least some of the plurality of cameras into the plurality of groups.

(3)
The information processing apparatus according to (1) or (2) above, in which,
on the basis of positions of the plurality of cameras, the grouping block is configured to sort the plurality of cameras into the plurality of groups.

(4)
The information processing apparatus according to (3) above, in which
the group information is configured to be information indicative of a gravity center position of a region including the camera sorted into the group.

(5)
The information processing apparatus according to (1) or (2) above, in which
the grouping block is configured to sort, for each three-dimensional object corresponding to three-dimensional data generated by use of the two-dimensional image data, a camera corresponding to the two-dimensional image data into the group.

(6)
The information processing apparatus according to (5) above, in which
the group information is configured to be information indicative of the three-dimensional object corresponding to the group.

(7)
The information processing apparatus according to (1) or (2) above, in which
the grouping block is configured to sort, for each three-dimensional space corresponding to three-dimensional data generated by use of the two-dimensional image data, a camera corresponding to the two-dimensional image data into the group.

(8)
The information processing apparatus according to (7) above, in which
the group information is configured to be information indicative of the three-dimensional space corresponding to the group.

(9)
An information processing method including:
by an information processing apparatus,
a grouping step of sorting a plurality of cameras for acquiring two-dimensional image data into a plurality of groups;
a group information generation step of generating group information related with each of the plurality of groups; and
a camera information generation step of generating, for each of the groups, camera information for use in generating three-dimensional data from the two-dimensional data acquired by the camera sorted into the group.

(10)
An information processing apparatus including:
a group selection block configured to select, when a plurality of cameras for acquiring two-dimensional image data are sorted into a plurality of groups, a predetermined group from the plurality of groups on the basis of group information related with the group; and a camera information acquisition block configured to acquire camera information for use in generating three-dimensional data from the two-dimensional image data acquired by the camera sorted into the predetermined group selected by the group selection block.

(11)

The information processing apparatus according to (10) above, further including:

a three-dimensional data generation block configured to generate three-dimensional data from the two-dimensional image data acquired by the camera sorted into the predetermined group by use of the camera information acquired by the camera information acquisition block.

(12)

The information processing apparatus according to (10) or (11), in which, of the plurality of groups with at least some of the plurality of cameras sorted for each processing capacity of the information processing apparatus, the group selection block is configured to select the predetermined group from the plurality of groups corresponding to the processing capacities of own information processing apparatus.

(13)

The information processing apparatus according to any one of (10) through (12) above, in which the plurality of cameras are configured to be sorted into the plurality of groups on the basis of positions of the plurality of cameras.

(14)

The information processing apparatus according to (13) above, in which the group information is configured to be information indicative of a gravity center position of a region including the camera sorted into the group; and the group selection block is configured to select the predetermined group on the basis of a position of a virtual viewpoint and the group information.

(15)

The information processing apparatus according to any one of (10) through (12) above, in which a camera corresponding to the two-dimensional image data is configured to be sorted into the group for each three-dimensional object corresponding to three-dimensional data generated by use of the two-dimensional image data.

(16)

The information processing apparatus according to (15) above, in which the group information is configured to be information indicative of the three-dimensional object corresponding to the group; and the group selection block is configured to select, as the predetermined group, a group corresponding to the group information indicative of the three-dimensional object that is a subject in an image of a virtual viewpoint.

(17)

The information processing apparatus according to any one of (10) through (12) above, in which a camera corresponding to the two-dimensional image data is configured to be sorted into the group for each three-dimensional space corresponding to three-dimensional data generated by use of the two-dimensional image data.

(18)

The information processing apparatus according to (17) above, in which the group information is configured to be information indicative of the three-dimensional space corresponding to the group; and the group selection block is configured to select, as the predetermined group, a group corresponding to the group information indicative of the three-dimensional space including a virtual viewpoint.

(19)

An information processing method including:

by an information processing apparatus, a group selection step of selecting, when a plurality of cameras for acquiring two-dimensional image data are sorted into a plurality of groups, a predetermined group from the plurality of groups on the basis of group information related with the group; and a camera information acquisition step of acquiring camera information for use in generating three-dimensional data from the two-dimensional image data acquired by the camera sorted into the predetermined group selected by processing of the group selection step.

REFERENCE SIGNS LIST

12 Encoding apparatus, 13 Decoding apparatus, 33 Three-dimensional data generation block, 51 Grouping block, 52 Global table generation block, 53 Group table generation block, 71 Virtual camera, 72-0 through 72-2 Three-dimensional objects, 73-0 through 73-2 Regions, 81-0 through 81-2 Partial regions, 121-0 through 121-2 Three-dimensional space partitioned regions, 142 Group selection block, 143 Group table acquisition block, 160, 200, 220 Positions

The invention claimed is:

1. An information processing apparatus comprising:
a grouping block configured to sort a plurality of cameras for acquiring two-dimensional image data into a plurality of groups;
a group information generation block configured to generate group information related with each of the plurality of groups;
a camera information generation block configured to generate, for each of the groups, camera information for use in generating three-dimensional data from the two-dimensional image data acquired by the camera sorted into the group;
a group selection block configured to select a predetermined group from the plurality of groups on a basis of group information related with the group; and
a camera information acquisition block configured to acquire camera information for use in generating three-dimensional data from the two-dimensional image data acquired by a camera sorted into the predetermined group selected by the group selection block,
wherein the grouping block is configured to sort the plurality of cameras into the plurality of groups on a basis of positions of the plurality of cameras,
wherein the group information is configured to be information indicative of a gravity center position of a region including the camera sorted into the group,
wherein the group selection block is configured to select a predetermined group corresponding to a gravity center nearest a position of a free viewpoint identified by free viewpoint information, and
wherein the grouping block, the group information generation block, the camera information generation block, the group selection block, and the camera information acquisition block are each implemented via at least one processor.

2. The information processing apparatus according to claim 1, wherein
the grouping block is configured to sort, for each processing capacity of an information processing apparatus for reproducing the two-dimensional image data, at least some of the plurality of cameras into the plurality of groups.

3. The information processing apparatus according to claim 1, wherein
the grouping block is configured to sort, for each three-dimensional object corresponding to three-dimensional data generated by use of the two-dimensional image data, a camera corresponding to the two-dimensional image data into the group.

4. The information processing apparatus according to claim 3, wherein
the group information is configured to be information indicative of the three-dimensional object corresponding to the group.

5. The information processing apparatus according to claim 1, wherein
the grouping block is configured to sort, for each three-dimensional space corresponding to three-dimensional data generated by use of the two-dimensional image data, a camera corresponding to the two-dimensional image data into the group.

6. The information processing apparatus according to claim 5, wherein
the group information is configured to be information indicative of the three-dimensional space corresponding to the group.

7. An information processing method comprising:
by an information processing apparatus,
a grouping step of sorting a plurality of cameras for acquiring two-dimensional image data into a plurality of groups;
a group information generation step of generating group information related with each of the plurality of groups; and
a camera information generation step of generating, for each of the groups, camera information for use in generating three-dimensional data from the two-dimensional image data acquired by the camera sorted into the group,
a group selection step of selecting a predetermined group from the plurality of groups on a basis of group information related with the group; and
a camera information acquisition step of acquiring camera information for use in generating three-dimensional data from two-dimensional image data acquired by a camera sorted into the predetermined group selected by the group selection step,
wherein the grouping step comprises sorting the plurality of cameras into the plurality of groups on a basis of positions of the plurality of cameras,
wherein the group information is configured to be information indicative of a gravity center position of a region including the camera sorted into the group, and
wherein the group selection step selects a predetermined group corresponding to a gravity center nearest a position of a free viewpoint identified by free viewpoint information.

8. The information processing apparatus according to claim 1, further comprising:

a three-dimensional data generation block configured to generate three-dimensional data from the two-dimensional image data acquired by the camera sorted into the predetermined group by use of the camera information acquired by the camera information acquisition block,
wherein the three-dimensional data generation block is implemented via at least one processor.

9. The information processing apparatus according to claim 1, wherein,
of the plurality of groups with at least some of the plurality of cameras sorted for each processing capacity of the information processing apparatus, the group selection block is configured to select the predetermined group from the plurality of groups corresponding to the processing capacities of own information processing apparatus.

10. The information processing apparatus according to claim 1, wherein
a camera corresponding to the two-dimensional image data is configured to be sorted into the group for each three-dimensional object corresponding to three-dimensional data generated by use of the two-dimensional image data.

11. The information processing apparatus according to claim 10, wherein
the group information is configured to be information indicative of the three-dimensional object corresponding to the group; and
the group selection block is configured to select, as the predetermined group, a group corresponding to the group information indicative of the three-dimensional object that is a subject in an image of a virtual viewpoint.

12. The information processing apparatus according to claim 1, wherein
a camera corresponding to the two-dimensional image data is configured to be sorted into the group for each three-dimensional space corresponding to three-dimensional data generated by use of the two-dimensional image data.

13. The information processing apparatus according to claim 12, wherein
the group information is configured to be information indicative of the three-dimensional space corresponding to the group; and
the group selection block is configured to select, as the predetermined group, a group corresponding to the group information indicative of the three-dimensional space including a virtual viewpoint.

14. An information processing method comprising:
by the information processing apparatus according to claim 1,
a group selection step of selecting, when a plurality of cameras for acquiring two-dimensional image data are sorted into a plurality of groups, a predetermined group from the plurality of groups on a basis of group information related with the group; and
a camera information acquisition step of acquiring camera information for use in generating three-dimensional data from the two-dimensional image data acquired by the camera sorted into the predetermined group selected by processing of the group selection step.

* * * * *